(12) United States Patent
Goehlich

(10) Patent No.: US 6,897,784 B2
(45) Date of Patent: May 24, 2005

(54) WATER MONITORING SYSTEM AND WATER MONITORING METHOD FOR HIGH VOLTAGE CABLES

(75) Inventor: Lothar Goehlich, Berlin (DE)

(73) Assignee: Pirelli Kabel und Systeme GmbH & Co. KG, Berlin (DE)

( * ) Notice: Subject to any disclaimer, the term of this patent is extended or adjusted under 35 U.S.C. 154(b) by 0 days.

(21) Appl. No.: 10/344,238
(22) PCT Filed: Aug. 14, 2001
(86) PCT No.: PCT/EP01/09384
§ 371 (c)(1), (2), (4) Date: Aug. 21, 2003
(87) PCT Pub. No.: WO02/14823
PCT Pub. Date: Feb. 21, 2002

(65) Prior Publication Data
US 2004/0036614 A1 Feb. 26, 2004

(30) Foreign Application Priority Data
Aug. 14, 2000 (EP) .......................................... 00117548

(51) Int. Cl.$^7$ .............................................. G08B 21/00
(52) U.S. Cl. ...................... 340/635; 340/660; 340/661; 340/662; 340/663; 324/522
(58) Field of Search ................................ 340/635, 660, 340/661, 662, 663; 324/500, 522, 523, 527

(56) References Cited

U.S. PATENT DOCUMENTS 4,980,645 A * 12/1990 Soma et al. ................ 324/541

FOREIGN PATENT DOCUMENTS

DE 195 27 972 A1 1/1997
DE 195 44 391 A1 5/1997

OTHER PUBLICATIONS

U. Glaese et al., "Uberwachung von Hochspannungskabelanlagen Methoden und Kundennutzen", Elektricitatswirtschaft, vol. 24, No. 16, pp. 992–1000 (1995).

U. Glaese, "Entwicklung eines automatisierten Monitoring Systems fur Hochspannungskabul", VDI– Fortschritt–Berichte 321, pp. 106–113, (1996).

* cited by examiner

Primary Examiner—Julie B. Lieu
(74) Attorney, Agent, or Firm—Finnegan, Henderson, Farabow, Garrett & Dunner, L.L.P.

(57) ABSTRACT

A water monitoring system and a water monitoring method for a high voltage cable including a conductor and a screen surrounding the conductor. At least a first water sensing wire extends in the screen between the cable beginning and the cable end and at least a second wire is connected with the first wire at the cable end to form a loop. A first switching unit is provided between the cable beginning and the measurement circuit. A control unit controls the first switching unit over a first predetermined time interval into a first switching state in which the water sensing wire and the second wire are connected to the screen potential. In a following second predetermined time interval the control unit controls the first switching unit into a second switching state in which the water sensing wire and the second wire are disconnected from the screen potential. The measurement circuit performs a water intrusion measurement in the second predetermined time interval.

20 Claims, 15 Drawing Sheets

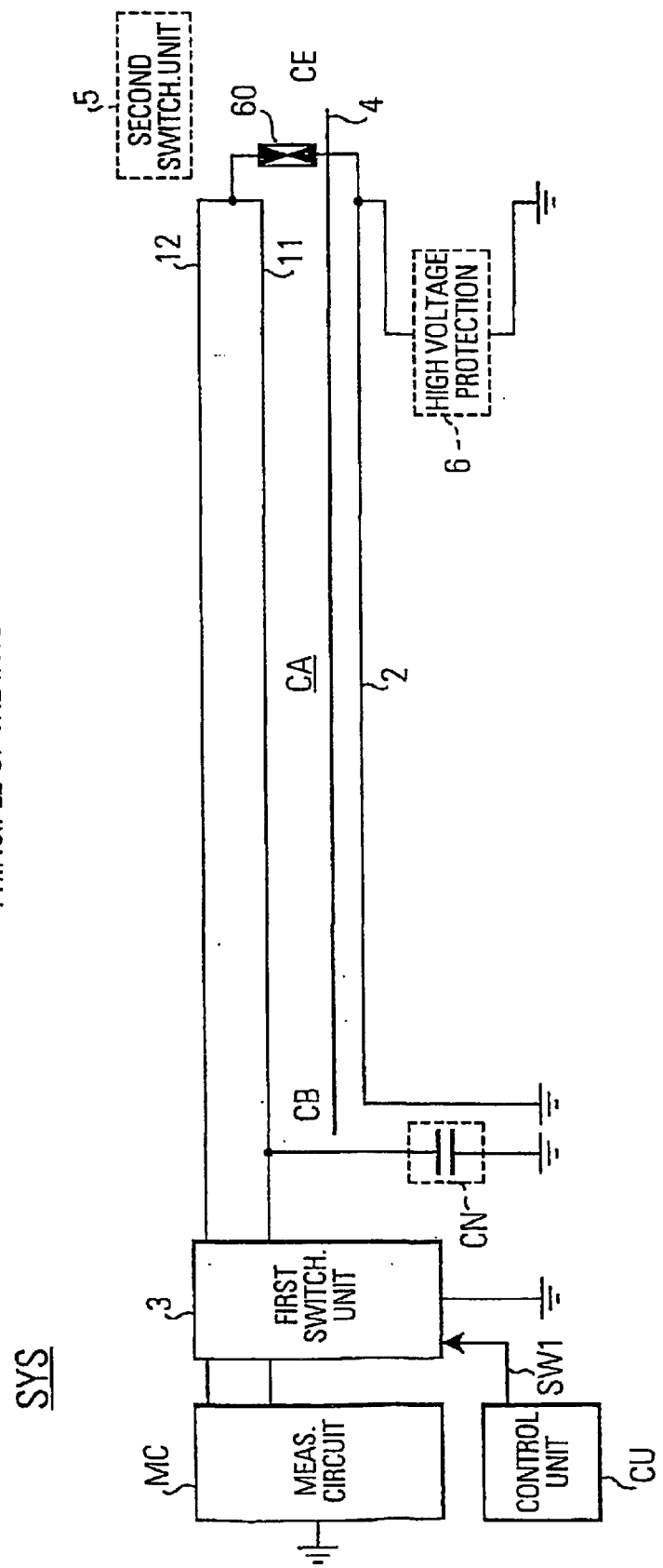

PRINCIPLE OF THE INVENTION

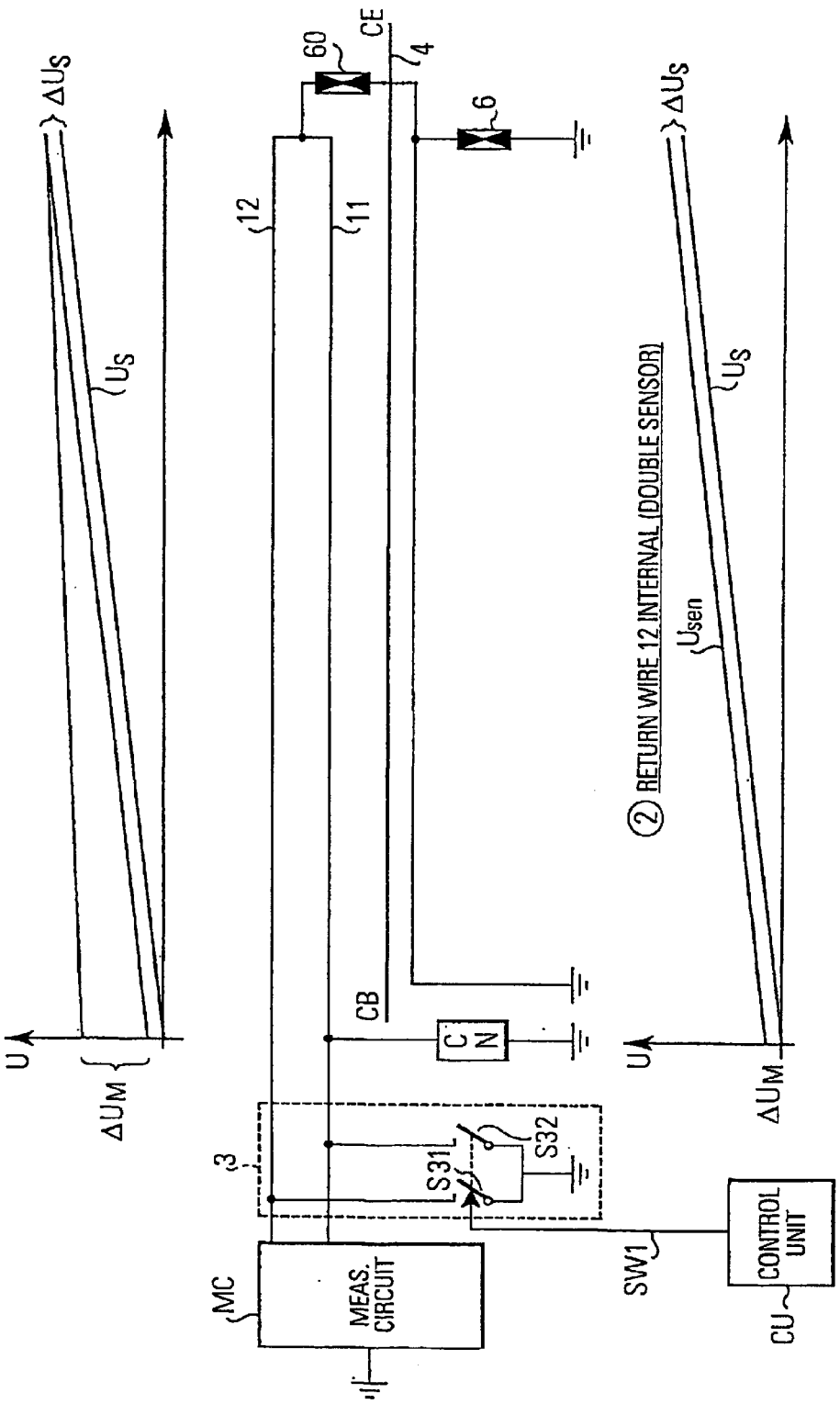

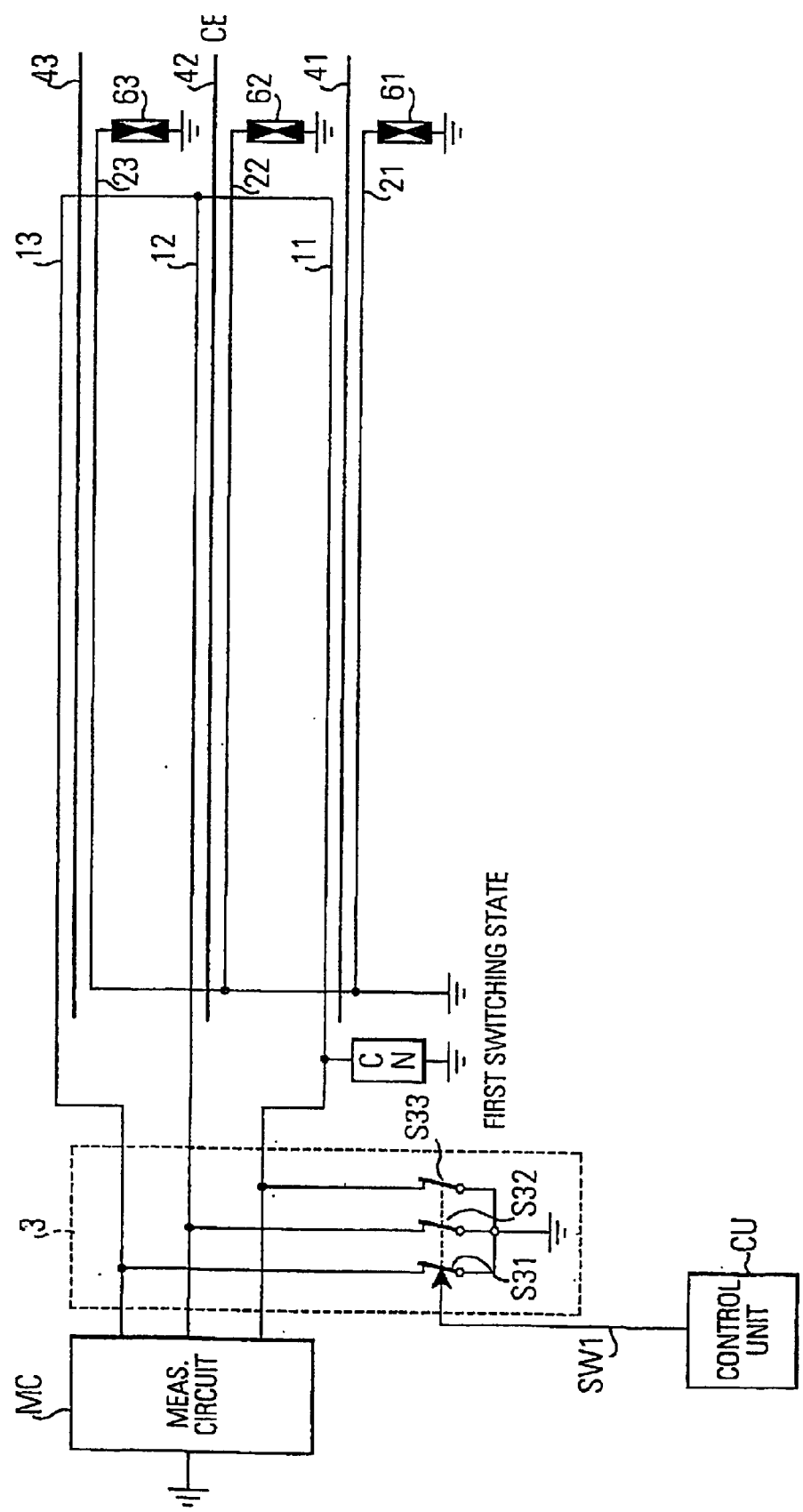

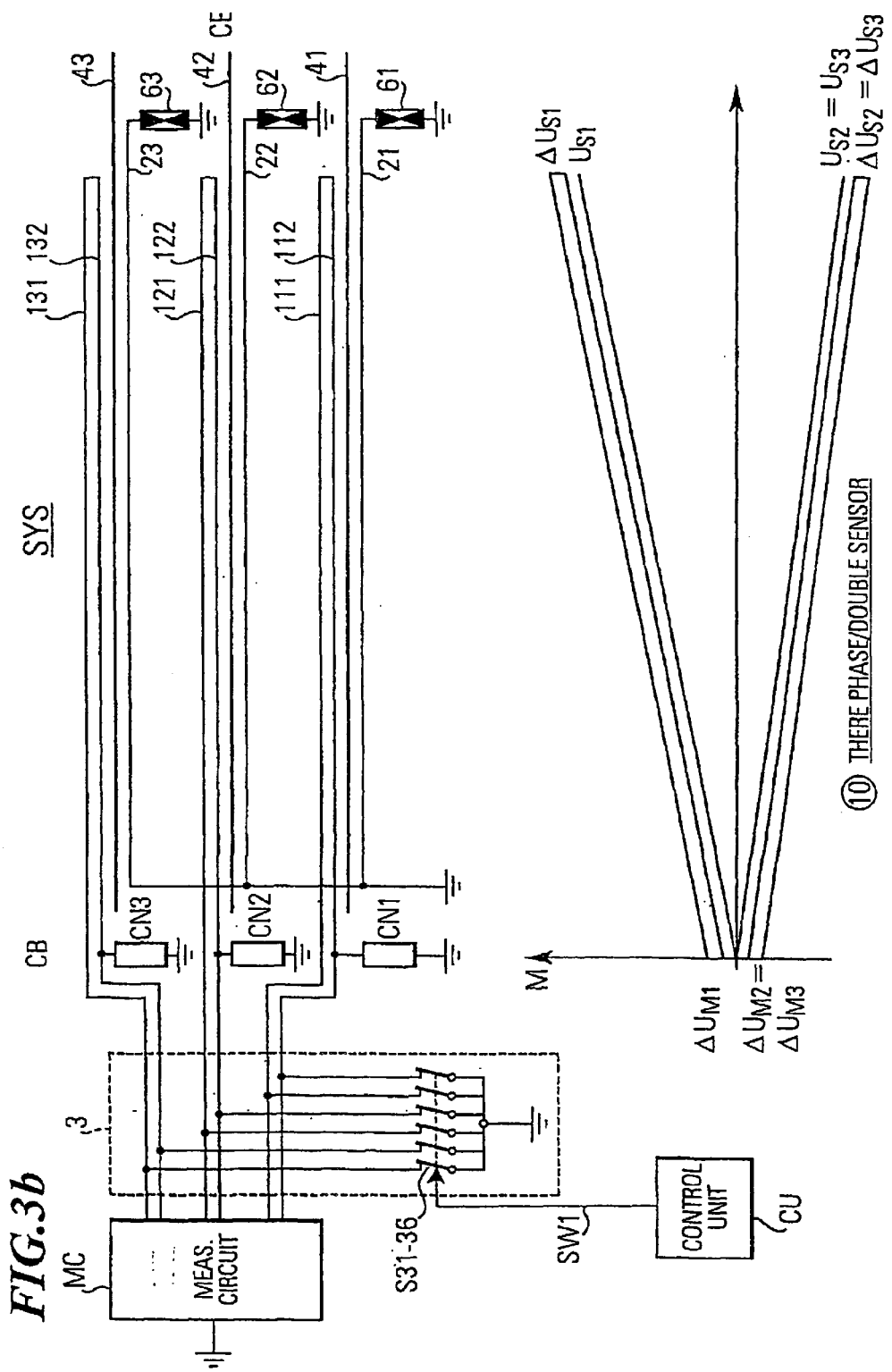

PRINCIPLE OF THE INVENTION

WATER MONITORING SYSTEM AND WATER MONITORING METHOD FOR HIGH VOLTAGE CABLES

CROSS REFERENCE TO RELATED APPLICATIONS

This application is a national phase application based on PCT/EP01/09384, filed Aug. 14, 2001, the content of which is incorporated herein by reference, and claims the priority of European Patent Application No. 00117548.8, filed Aug. 14, 2000, the content of which is incorporated herein by reference.

FIELD OF THE INVENTION

The present invention relates to a water monitoring system and a water monitoring method for a high voltage cable including at least one conductor and a screen surrounding said conductor. In particular, the present invention relates to a water monitoring system which comprises a first water sensing wire extending in the screen between the cable beginning and the cable end and at least a second wire connected to the first sensing wire at the cable end for forming a loop. A measuring circuit is provided which determines at least the occurrence of a water intrusion into the cable on the basis of voltage drop measurements at the first water sensing wire or the second wire.

In such a water monitoring system and method measurement conditions can occur in which induced voltages on the water sensing wire substantially differ from voltages in the screen leading to inaccurate water intrusion measurements and damage of the cable by thermal and electro-thermal effects. The invention particularly addresses these problems in order to increase the measurement accuracy and lifetime of the cable.

BACKGROUND OF THE INVENTION

A high voltage transmission system comprises, depending on whether it is single-phase, double-phase or three-phase, one or more high voltage cables. Typically, the high voltage cable comprises a conductor and a screen surrounding set conductor. Furthermore, the high voltage cable is provided with an insulating and water-proof outer coating. In order to avoid the entry of water or water vapours through the outer coating to the cable conductor the outer coating preferably consists of metal or a metal sheet in combination with an outer layer of PE or PVC (layer coating). The avoidance of water intrusion is of particular significance, since intruded water accelerates the aging processes of the insulating materials of the cable made of cross-linked polyethylene and thus leads to an early damage or failure of the cable.

Water monitoring systems and water monitoring methods are therefore used in order to detect the water intrusion into the cable and to determine the location of the water intrusion. Typically, one or more water sensing wires are provided in the conductor screen and a measuring circuit performs voltage drop measurements at the water sensing wire or water sensing wires because a water intrusion into the cable will cause a change of the isolation resistance of the water sensing wire and thus different voltage drops at the water sensing wire. In order to perform the voltage drop measurements typically the measuring circuit injects a measuring current into the water sensing wire.

Whilst the provision of the water sensing wire in the cable has the advantage of allowing the detection and locating of a water intrusion into the cable, of course the water sensing wire itself is an additional electrical component in the cable. This additional electrical component as well as the manner in which the water intrusion measurement is carried out (i.e. how the current, voltage or resistance measurements are carried out), can alter the electrical characteristics of the cable in certain conditions. That is, a water intrusion into the cable, which is provided with a water sensing wire should not produce, merely due to the provision of the water sensing wire, additional side effects in comparison to a cable which is not provided with such a water sensing wire.

More specifically, since the water sensing wire extends in the screen either parallely to the conductor or is wound around the conductor voltages may be induced in the water sensing wire due to the currents flowing in the conductor. In case of a water intrusion such induced voltages cause currents flowing through the water intrusion location leading to a local increase of temperature and can cause electro/chemical effects.

DESCRIPTION OF THE PRIOR ART

In the German patent applications DE 195 44 391 A1 and DE 195 27 972 Pirelli describes a water monitoring system for a three-phase power transmission system. Each of the three cables has a respective water sensing wire and the three sensing wires are connected at the cable beginning and the cable end through serially connected measurement and termination resistors. At the cable end the common connection node is connected to ground via a load resistance. At the cable beginning a DC voltage source is connected between the common connection point at the cable beginning and ground. Also the screens are connected to ground. The DC currents flowing in the water sensing wires constitute a measure for the presence or absence of a water intrusion and also a measure for the location of the water intrusion.

Since in this type of water monitoring system additional measurement and load impedances need to be provided, induced voltages in case of a water intrusion failure or the measurement voltage itself can however change the possible straining of the cable dependent on the choice of magnitude for the measurement and load impedances.

The size of the measurement impedances, load impedances and termination impedances with respect to the sensor impedance in the cable is however decisive for the measurement accuracy regarding the determination of the location of the water intrusion failure. Impedance values which as such provide a high measurement accuracy unfortunately lead to increased electrical and thermal straining of the cable in case of a water failure.

In VDI Fortschritt-Berichte 321, Nr. 212, Hannover, "Entwicklung eines automatisierten Monitoring Systems für Hochspannungskabel", page 108 by U. Glaese it is described to connect the cable at both ends to ground such that the voltage of the cable screen with respect to earth is zero. This effect is based on the equality and the opposite sign of the induced voltage and the voltage drop of the currents flowing in the screen which is caused by the induced voltage. These considerations are equally valid for the water sensing wire insulated from the screen.

The measurement and load impedances in this type of measurement circuit however reduce the current and thus the voltage drop in the sensor whereby the difference to the induced voltage is directly applied at these impedances. If there is a water intrusion near the cable beginning or the cable end, this voltage may cause a current through the water intrusion location which may lead to a damage to the cable at this position due to a local increase of temperature and electro/chemical effects and its influence on the water treeing process.

FIG. 5 shows a water monitoring system SYS where such disadvantages are partially avoided. In FIG. 5 a so-called ground-free measurement is carried out. A conductor 4 is surrounded by a screen 2 and a first water sensing wire 11 having a resistance $R_{11}$ is provided in the screen 2. A return wire 12 having a resistance $R_{12}$ is connected with the water sensing wire 11 at the cable end CE. The return wire 12 extends from the cable end CE to the cable beginning CB. As can be seen from FIG. 5, even for the single-phase system all measurement impedances, load impedances and termination impedances at the cable end CE are avoided and the measurement circuit MC essentially imposes a constant current I onto the water sensing wire 11. In particular, the water sensing wire and the return wire are connected at the cable end CE without being connected to the screen. At the cable beginning CB the wires need to be connected via series connections of ohmic and capacitive resistors of the measurement network MN. In particular, the measurement network MN comprises a series resistor $RI_1$, $RI_2$ respectively connecting the wires 11, 12 to the current source I, a series connection of a resistor Rs1; Rs2 and a capacitor Cs1; Cs2 connecting the respective wire 11, 12 capacitively to ground, and a smoothing capacitor Cp connected between the terminals of the current source I. As regards the connection to ground, it may be noted that for the ground free measurement in the measurement circuit MC the wires 11, 12 must not be connected to ground directly (i.e. through a direct current short circuit) because a ground-free measurement must be carried out with a direct current provided by the current source. The connection to ground via a capacitor Cs1, Cs2 is only an AC ground connection and does not present a short circuit for DC currents but allows to reduce balancing times when large voltage changes occur. On the other hand, the screen 2 is indeed directly connected to ground thus making a ground connection for both AC and DC currents. The capacitive coupling of the wires 11, 12 to ground has an influence on the voltages and the way how voltages build up on and between the wires 11, 12, the screen 2 and the conductor 2 by contrast to a case where they are not provided.

As shown in FIG. 5a, in case of no water intrusion, there is no current flow to ground and only a minimal measurement current I circulates in the water sensing wire 11 and in the connected second wire 12.

In case of a water intrusion, as shown in FIG. 5b, a water intrusion location causing a resistance $R_w$ between the water sensing wire 11 and the screen 2 causes a part $I_{Rw}$ of the current to pass through the resistor $R_w$ whilst another portion $I_{R11}$ of the current I will flow through the water sensing wire 11 and the second wire 12. A voltage drop measurement unit $V_1$ measuring the voltage of the water sensing wire 11 to ground will detect a voltage drop over the partial resistance $R_{111}$ and the resistor $R_w$. If this voltage drop is determined, in principle a water intrusion can be detected.

If a second voltage measurement unit $V_2$ is provided which measures the voltage of the second wire 11 with respect to ground, the voltage drop over the partial resistor $R_{112}$ and the resistor $R_{12}$ is measured. By carrying out these two measurements not only the water intrusion but also the location of the water intrusion can be determined by putting into relationship the sizes of the voltage drops in the first and second measurements, i.e. by putting into relationship the determined resistances $R_{111}$ and $R_{112}$.

Whilst indeed in FIG. 5a, in case of no water intrusion, no current flows to ground and no voltage drop is measured, the measurement network MN results in the disadvantage that the induced voltages are not compensated to zero over the cable length or that the capacitances become so large that for pulsating DC voltages very large compensating times are needed. The type of circuit MC shown in FIG. 5 for a single-phase system must in principle be provided in a similar manner in case of a two-phase or three-phase system. Also in a three-phase system the induced voltages over the cable length are not compensated to zero.

In FIG. 5 the screen 2 is connected to ground at the cable beginning CB, which is very disadvantageous. In fact, any situation where the screen 2 is connected to ground only at one end of the cable is very problematic, because the induced voltages in the water sensing wire 11 will be very different to the voltages induced in the screen 2. To avoid that large voltage differences occur between the screen and the water sensing wire or the return wire it may be envisaged to use protection circuits between the wires and ground. Such protection circuits may avoid large voltage differences for pulse-like operations in the $\mu s$ or s-region. However, in steady state conditions already voltages of several 10V may deteriorate the isolation of the water sensing wire with respect to the cable screen during normal operation (no water intrusion) and even more so in the failure case (water intrusion).

SUMMARY OF THE INVENTION

As explained above, even when using a water monitoring system SYS as in principle shown in FIG. 5 and using a ground-free measurement, the voltages induced in the screen and the water sensing wire, respectively may differ in magnitude and phase. Such voltage differences can even for the case of the earth-free measurement current cause a damage of the cable during normal operation as well as in the failure condition and decrease the measurement accuracy.

Therefore, the object of the present invention is to provide a water monitoring system and a water monitoring method of the earth-free configuration, which avoid that large voltage differences occur between the water sensing wire and the screen of the cable.

This object is solved by a water monitoring system (claim 1) for a high voltage cable including at least one conductor and a screen surrounding said conductor, comprising: a first water sensing wire extending in the screen between the cable beginning and the cable end; at least a second wire connected to the first water sensing wire at the cable end for forming a loop and extending from the cable end to the cable beginning; and a measuring circuit provided at the cable beginning and adapted to determine at least the occurrence of a water intrusion into the cable on the basis of voltage drop measurements at the first water sensing wire or the second wire; wherein a first switching unit is provided between the cable beginning and the measurement circuit, said first switching unit being adapted to assume in response to a first switching signal, a first switching state in which said first water sensing wire and said second wire are connected to the screen potential when the first switching signal has a first state; and a second switching state in which said first water sensing wire and said second wire are disconnected from the screen potential when the first switching signal has a second state; and a control unit adapted to output the first switching signal in the first state over a first predetermined time interval and thereafter to switch the first switching signal into the second state over a second predetermined time interval; wherein said measurement circuit is adapted to perform said water intrusion measurement in said second predetermined time interval.

According to the invention, the water sensor wires are directly connected at the cable beginning and the cable end over the first predetermined time interval and are set to the same potential as the screen, e.g. to ground. Thus, the same voltages are induced in the sensors and the cable screen(s). In the second predetermined time interval the water intrusion measurement is carried out via the voltage drop measurements.

Preferably (claim 16, claim 20), the first predetermined time interval is longer than the second predetermined time interval in order to reduce the electrical strain on the cable. Thus, thermal effects by induced currents are significantly reduced.

Preferably (claim 2, claim 19), the measurement circuit is disconnected from the wires in the first switching state and the measurement circuit is connected to the wires in the second switching state. Depending on the internal configuration of the measurement circuit and of its measurement network it may thus be avoided that currents caused by charges stored in the measurement network flow into the water sensing wires.

Preferably (claim 3), the water monitoring system may be provided in such a manner that the first water monitoring wire and the second wire are both provided in the screen surrounding the conductor, e.g. in the single-phase system. The second wire may be a second water sensing wire or may be an insulated return wire provided in the screen. Thus, the water monitoring system can advantageously be applied to a single-phase system.

Preferably (claim 4), if the high voltage cable is a two-phase system consisting of at least two conductors surrounded by a respective screen, the first water sensing wire may be provided in the screen surrounding the first conductor and the second wire as a second water sensing wire is provided in the screen surrounding the second conductor. Thus, the water monitoring system can advantageously be applied to a two-phase system.

Preferably (claim 5), if the high voltage cable consists of three conductors surrounded by a respective screen, the water monitoring systems may comprise a first, second and third water sensing wire respectively provided in the screen surrounding the respective first, second and third conductor. Thus, the water monitoring system can be applied to a three-phase system.

Preferably (claim 6), the screen or the screens as mentioned above is/are connected to ground at the cable beginning and/or the cable end. In this case, the first switching unit connects the water sensing wires to ground in the first switching state.

Preferably (claim 7), if the high voltage cable consists of three conductors surrounded by a respective screen, two water monitoring sensors may be provided in each screen surrounding the respective conductor.

Preferably (claim 8), the two water sensing wires may be connected at the cable beginning and the cable end, respectively. This reduces the response time in an advantageous manner.

Preferably (claim 12), a second switching unit may be provided at the cable end for connecting the water sensing wire respectively to the screen. Thus, primarily an operation with the sensor set to the screen potential is possible.

Preferably (claim 14), an over-voltage protection switch unit is provided between the screen and ground. This is in particular advantageous if large voltages are induced into the cable screen which increase from the cable beginning to the cable end as consequence of short circuit currents or travelling waves.

Further advantageous embodiments and improvements of the invention are listed in the dependent claims appending to the description. Furthermore, it should be noted that the disclosure presented herein only lists the preferred mode of the invention and should not be understood as limiting in any way. That is, a skilled person can carry out modifications and variations of the invention on the basis of the teaching of the present specification. In particular, the invention can comprise embodiments which result from an individual combination of features which have been described separately in the description and the claims.

BRIEF DESCRIPTION OF THE DRAWINGS

In the drawings the same or similar reference numerals denote the same or similar parts and steps throughout the specification.

FIG. 1a shows a block diagram of a water monitoring system SYS in accordance with the principle of the invention applied to a single-phase transmission system;

FIG. 1c shows an embodiment of the first switching unit 3 for the case of FIG. 1a;

FIG. 2b shows an embodiment of the first switching 3 unit for the three-phase system in FIG. 2a, in particular showing the first switching unit 3 in the first switching state;

FIG. 3b shows an embodiment of the first switching 3 unit in case of FIG. 3a;

Hereinafter, the preferred mode of the invention as presently conceived by the inventors will be described. However, it should be understood that other modifications and variations of the invention are possible on the basis of the teachings herein.

In some drawings induced voltages are shown in principle to demonstrate the aim of the invention. These voltages can be understood as effective voltage or instantaneous value with regard to the propagation, along the cable and with regard to the phase angle.

First Embodiment (Single Phase/Single or Double Sensor)

Figure 1B:
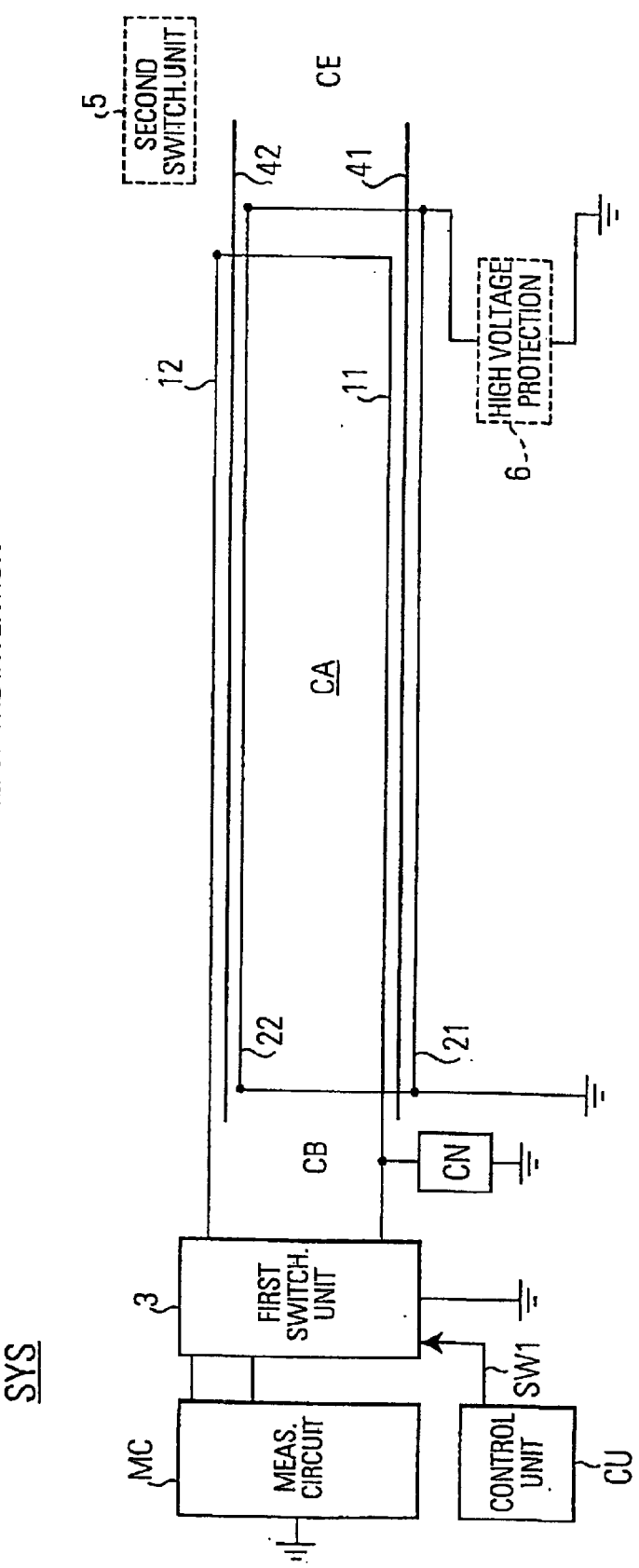
FIG. 1b shows a block diagram of a water monitoring system SYS in accordance with the principle of the invention applied to a two-phase transmission system.

FIG. 1a shows a water monitoring system in accordance with the principle of the invention when applied to a single-phase power transmission system. FIG. 1b shows a water monitoring system SYS in accordance with the principle of the invention when applied to a two-phase power transmission system.

In FIG. 1a the water monitoring system SYS is applied to a high voltage cable CA comprising a conductor 4 and a screen 2 surrounding said conductor 4. The water monitoring system SYS comprises a first water sensing wire 11 extending in the screen 2 between the cable beginning CB and the cable end CE. In order to allow an earth-free measurement as in principle described with reference to FIG. 5, a second wire 12 is connected to the first water sensing wire 11 at the cable end CE for forming a loop. The second wire 12 extends from the cable end CE to the cable beginning CB in order to form this loop. The measurement circuit MC is provided at the cable beginning CB and is adapted to determine at least the occurrence of a water intrusion into the cable CA on the basis of voltage drop measurements at the first water sensing wire 11 or the second wire 12. The measurement circuit MC may use a measuring technique as in principle described in FIG. 5 and must in principle, as schematically indicated in FIG. 1a, have a connection to ground since otherwise it would not be possible to detect a water intrusion through a current $I_{R_W}$ flowing to ground as explained with reference to FIG. 5. However, also other measuring techniques for performing the earth-free measurement by looping a current may be used and the invention should not be seen restricted to the measurement circuit MC described in FIG. 5.

Furthermore, as illustrated with the dashed boxes 5, 6, optionally a second switching unit 5 and a high voltage protection unit 6 may be used at the cable end CE. However, these circuits are optional and described hereinafter with reference to other embodiments. However, it should be noted that they can be used together with the arrangement in FIG. 1a. Furthermore, also a high voltage protection 60 between the water sensing wire arrangement 11, 12 and the screen is optional.

As described above with reference to FIG. 5, even in the loop-like and earth-free measurement of the insulation resistance, voltage differences between the voltages in the wires 11, 12 and the screen 2 occur, independently whether the screen 2 is connected to ground at the cable beginning CB and/or at the cable end CE.

According to the invention in FIG. 1, the screen 2 is assumed to be connected to ground directly (DC short circuit) at the cable beginning CB and is open (not connected to ground) at the cable end CE. A capacitive connection to ground of the wire 11 may be provided via a capacitive network CN, e.g. a capacitor. The capacitive network CN can be provided together or independently of the capacitive coupling to ground with the series connection of the resistor Rs1 and the capacitor Cs1 in the measurement circuit MC.

Furthermore, it should be noted that the second wire 12 may be a simple return wire provided independently of the cable or it may be an insulated wire also extending in the screen. Furthermore, the second wire 12 may also be a second water sensing wire characterized by being insulated as the sensing wire 11.

In accordance with the invention a first switching unit 3 is provided between the cable beginning CB and the measurement circuit MC. The first switching unit 2 is controlled by a first switching signal SW1 output by a control unit CU. The first switching unit 3 has a first switching state and a second switching state.

In the first switching state the first water sensing wire 11 and the second wire 12 are connected to the screen potential, e.g. ground, when the first switching signal has a first state.

In the second switching state the first water sensing wire 11 and the second wiring 12 are disconnected from the screen potential when the first switching signal SW1 assumes a second state. Preferably, depending on the internal configuration of the measurement circuit MC, it may be provided that in the first switching state said measurement circuit MC is disconnected from the wires 11, 12 and in the second switching state the measurement circuit MC is connected to the wires 11, 12. Advantageously, this can contribute to eliminate further influences of the measurement circuit MC, e.g. currents stored in the measurement network MN, on the water sensing wires.

Figure 4:
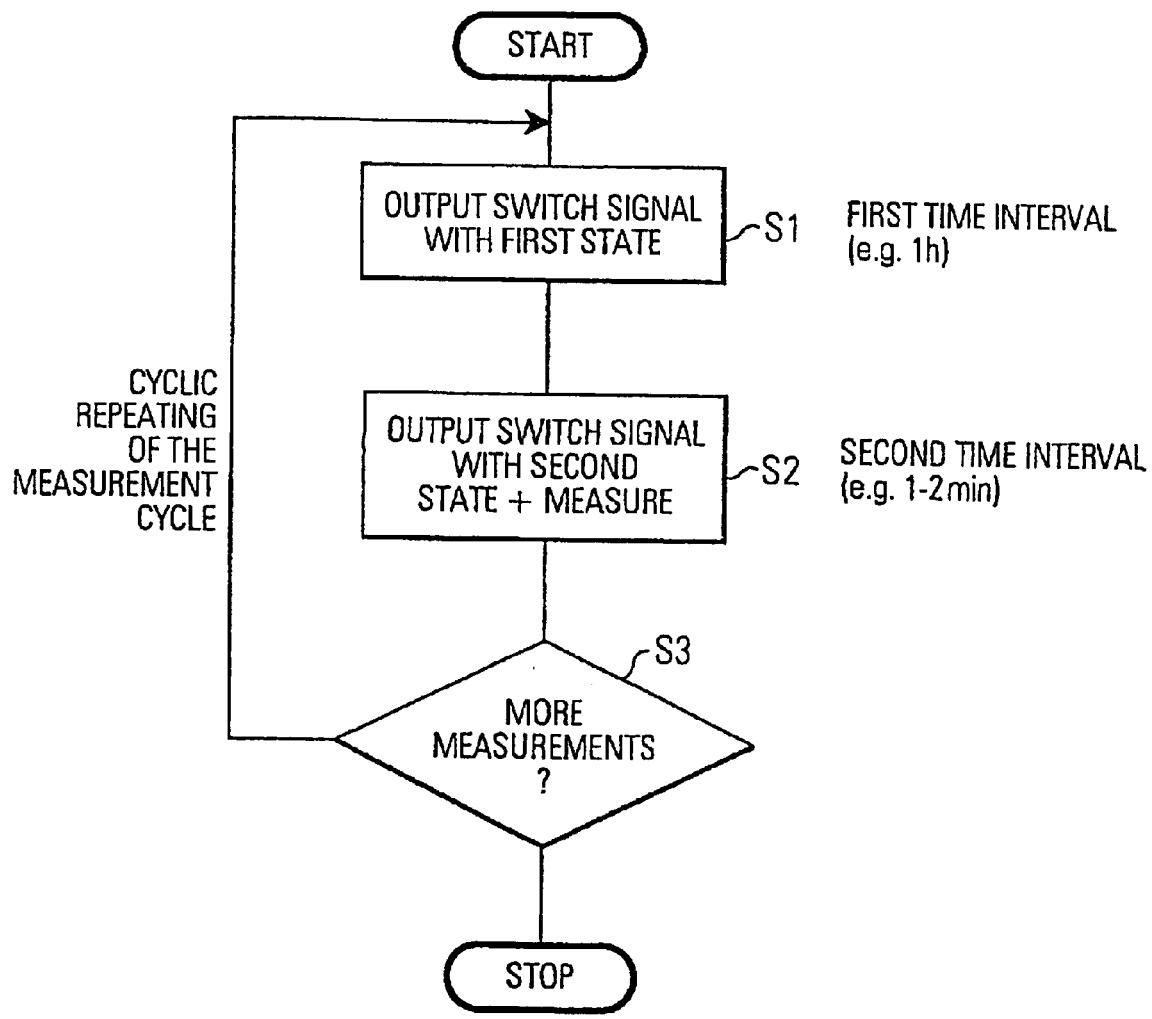
FIG. 4 shows a principle flow diagram of a water monitoring method in accordance with the invention.

The water monitoring system SYS as in principle shown in FIG. 1a operates as shown in FIG. 4. In a first step S1, i.e. in the first measuring phase, the control unit CU outputs the first switching signal SW1 in the first state over a first predetermined time interval. In this first measuring phase S1 the water sensing wire 11 and the second wire 12 are directly connected at the cable beginning CB and at the cable end CE and the connection of the wires 11, 12 at the cable beginning CB is set to the screen potential, for example to ground. Thus, in the first measurement phase S1 the same voltages are induced into the water sensing wire 11 and in the second wire 12 independently whether the screen 2 is connected to earth or is electrically an open circuit at the cable end CE. Therefore, between the wires 11, 12 and the cable screen 2 there are never any voltage differences, which may cause a straining of the water sensor insulation or may cause currents in possibly wet cable sections.

In the first measuring phase S1 there may be wet cable sections in the cable due to water intrusion and the operator does not detect this water intrusion or does not react to such a water intrusion and remedies the failure. In case of water intrusion in the first switching state S1 the cable CA provided with the water monitoring system MC, 3, 11, 12 reacts in the same manner as a cable CA without a water sensing wire because the same voltages are induced in the cable screen 2 and in the wires 11, 12 which compensate to zero.

Figure 5:
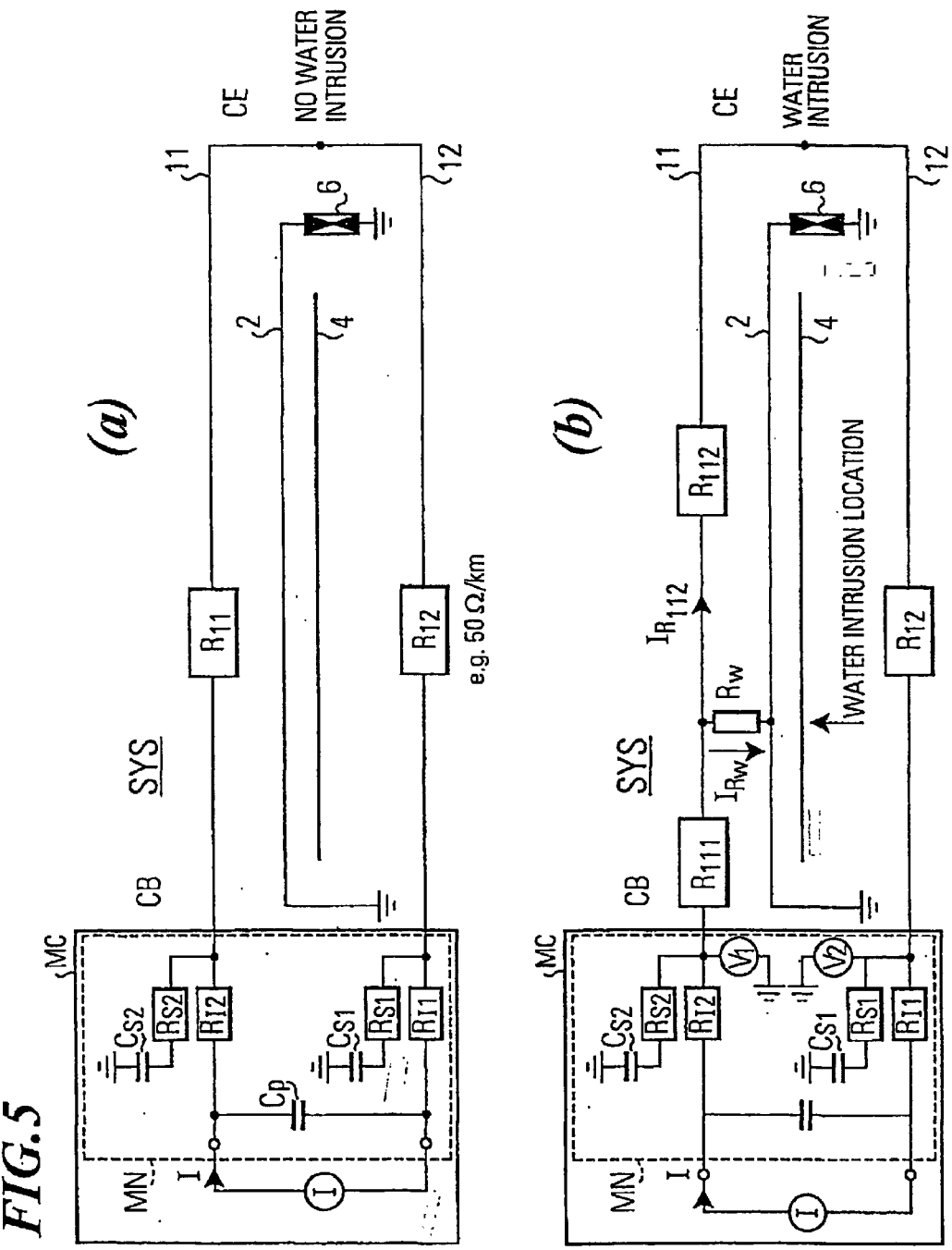
FIG. 5 shows a block diagram of a water monitoring system, in particular showing the earth-free measurement by using two wires in a loop configuration.

In step S2 the control unit CU outputs the first switching signal SW1 in the second state over a second predetermined time interval in order to stop the connecting of the wires 11, 12 (connected at the cable beginning CB) to the screen or ground potential. In the second measuring phase S2 the measurement circuit MC is connected to the wires 11, 12 and performs the water intrusion measurement in the second predetermined time interval. In the second measuring phase S2 the common failure resistance of the sensors can be measured via the voltage drop measurements and additionally a location determination of the water intrusion can be performed in accordance with conventional measurement methods if the insulation resistance is much lower than the insulation resistance, i.e. lower than 1000 Ω. A measurement circuit MC as shown in FIG. 5 can be used, however, the invention is not limited to this type of measurement circuit.

The only necessary requirement is that some type of voltage drop measurement is carried out in order to determine the partial resistors and put them into relationship in order to determine the water intrusion and the location thereof.

Preferably, the first time interval for the first measuring phase S1 is longer than the second time interval for the second measuring phase S2. For example, the first time interval may be one hour whilst the second time interval may be one or two minutes.

Further preferably, the first and second measuring phase S1; S2 is cyclically repeated as indicated with step S3 in FIG. 4. Furthermore, the length of the first and second time interval may be adapted to the possible water propagation characteristics and the time needed for the failure repair.

By contrast to a permanent measurement as in principle described above with reference to FIG. 5, the inventive water monitoring system and water monitoring method reduces the electrical straining duration of the cable to only approximately 2% such that in particular thermal or electrically/chemically deteriorating effects caused by the difference voltages on the wires 11, 12 and the screen 2 are virtually insignificant.

FIG. 1c shows an embodiment of the first switching circuit 3 in case of FIG. 1a. It comprises two switches S31, S32 for respectively connecting the wires 11, 12 to ground in response to the switching signal SW1. Since in FIG. 1c the screen 2 is connected to ground, switches S31, S32 also connect the wires 11, 12 to ground. That is, the wires 11, 12 are connected to the same potential as the screen 2.

In accordance with one embodiment the switches S31, S32 may be constituted by relays or by semiconductor switches for additionally avoiding over-voltages. The semiconductor switches can be controlled by the switching signal SW1 and will also automatically connect the wires 11, 12 to ground if the load current exceeds predetermined magnitude. As a result of the over-voltage protection feature of the semiconductor switches, a connection to ground may also occur in the second measurement phase S2 if a large load current occurs.

As may be understood from the above description of FIG. 1a, 1c, already in a single-phase system with the high voltage cable only consisting of one conductor 4, the first measuring phase S1 allows that currents in the cable conductor 4 induce currents in the screen 2 and in each wire 11, 12 whose voltage drop are opposite to the induced voltage. Consequently, there are no voltage differences between the screen and the wires 11, 12 at any portion of the cable. In the first measuring phase, preferably the measuring circuit MC is not connected to the wires 11, 12. The first measuring phase may be between 30 to 60 minutes. In the second measuring phase S2 the switches S31, S32 are opened and in this second switching state the measurement circuit MC is connected to the wires 11, 12 and voltages may occur between the wires 11, 12 and the screen.

In FIG. 1c, for the measurement phase, also the screen voltage Us, the sensor voltage Usen, the voltage ΔUs between sensor and screen and the voltage ΔUM between the wires (sensors) 11, 12 is shown for the case ① where the second wire 12 is a return wire external to the cable and the case ② where the second wire 12 also serves as a water sensing wire. It can be seen that due to the AC coupling of the wire 11 to ground and the direct ground connection of the screen 2 at the cable beginning, the arrangement in case ① has a first primary advantage of a small voltage between sensor and screen, i.e. a low electrical straining of the sensor isolation. The arrangement in case ② has the first primary advantage and a second primary advantage of also a small voltage between the sensors, i.e. for small influence of the electrical measurements.

It may be noted that in the cases ①, ② shown in FIG. 1c the screen 2 is only connected to ground at the cable beginning CB. However, it may be noted that the cases ①, ②, can be extended to respective cases ③, ④ (not shown in the drawings) where respectively the screen 2 would be connected directly to ground also at the cable end CE. Case ④ also has the afore-mentioned second primary advantage.
Second Embodiment (Double Phase/Single & Double Sensor)

FIG. 1b shows a water monitoring system SYS in accordance with the invention and similar to FIG. 1a when applied to a high voltage cable CA consisting of two conductors 41, 42 surrounded by a respective screen 21, 22. In this case the first water sensing wire 11 is provided in the screen 21 surrounding the first conductor 41 and the second wire 12 is, as a second water sensing wire 12, is provided in the screen 22 surrounding the second conductor 42. That is, in the two-phase system in FIG. 1b the loop configuration is formed by a respective water sensing wire 11, 12 respectively provided in the screen 21, 22 of the respective cable. Also in this case the currents in the respective cable conductors 41, 42 will induce currents in each respective screen 21, 22 and in each respective sensor 11, 12 wherein the voltage drop is opposite to the induced voltage. Thus, again in each cable no voltage differences between screen and water sensor can occur in the first measuring phase S1. As in FIG. 1a, also in FIG. 1b the screen is only connected to ground directly at the cable beginning CB and is open at the cable end CE. The first water sensing wire 11 is capacitively coupled to ground at the cable beginning CB through the capacitive network CN. A high voltage protection switch 6 can be provided optionally between the screen 2 and ground at the cable end CE.

Figure 1D:
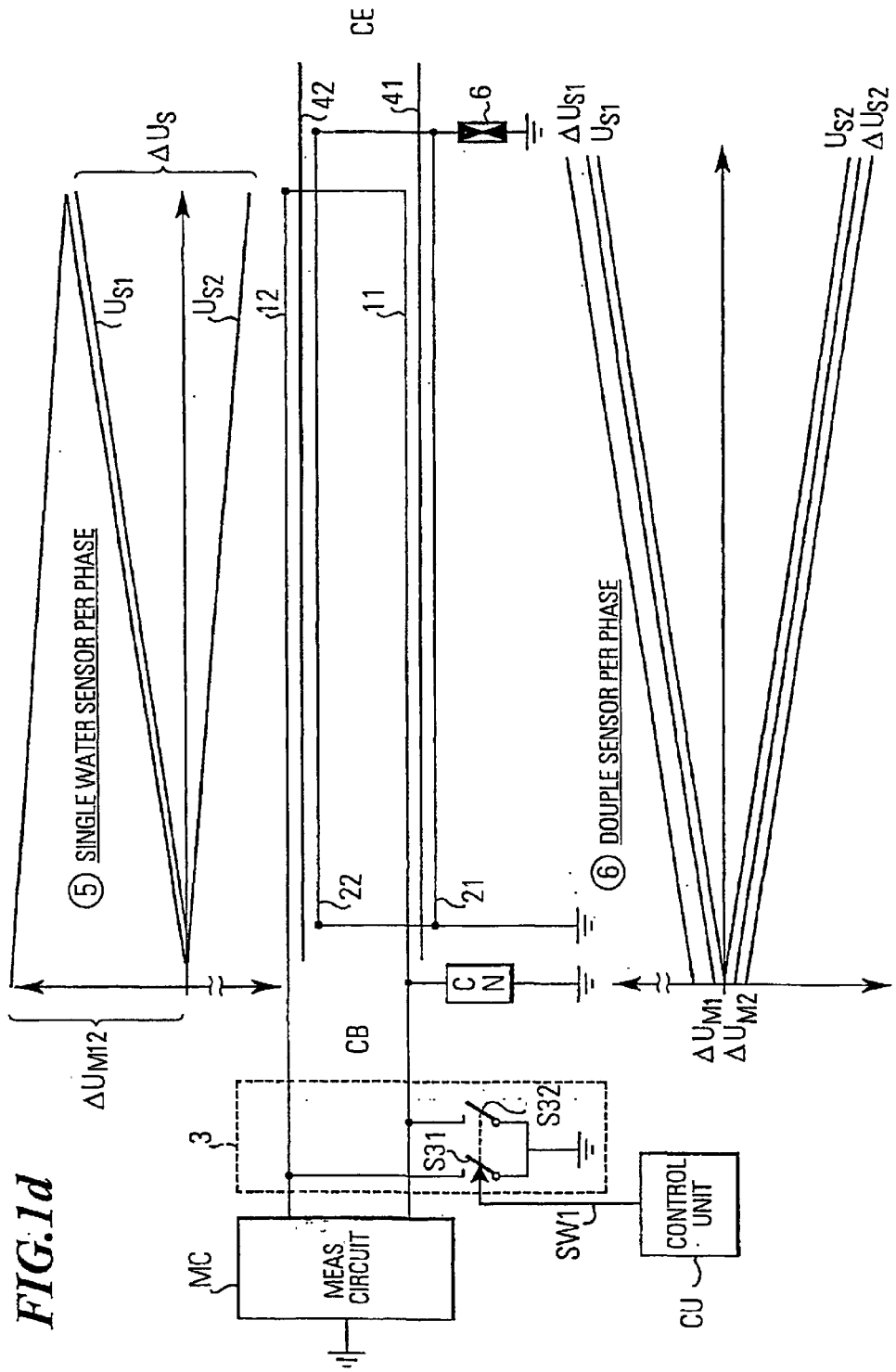
FIG. 1d shows an embodiment of the first switching unit 3 for he case of FIG. 1b.

FIG. 1d shows the embodiment of the first switching unit 3 for the configuration in FIG. 1b. The switching unit 3 comprises similarly as in FIG. 1c two switches S31, S32 for respectively connecting with ground or with the screen potential the first and second water monitoring sensors 11, 12. FIG. 1d shows the measurement phase S2 of FIG. 4. The voltage characteristics of the single water sensing wire per phase arrangement is shown with case ⑤ in FIG. 1d. The voltage characteristic of case ⑤ also shown in FIG. 1d relates to a case similar to case ⑤. In case ⑥ the wire arrangement is such that two water sensing wires are provided respectively around each conductor 41, 42 and screen 22, 21. At the cable end CE the respective two water sensing wires are connected to each other to respectively form a loop and at the cable beginning CB a first water sensing wire of the respective pair is connected to ground via a respective capacitive coupling network CN. However, the two pairs are not connected to each other at the cable end CE. As can be seen from the voltage characteristic, the case ⑥ has the afore-mentioned first and second primary advantages. Of course it should be understood that the voltage characteristics show the AC voltages and not the DC voltages.

As described above for the two-phase power transmission system in FIGS. 1b, 1d, in this two-phase system the loop-configuration for carrying out the earth-free measurement is performed by connecting two water monitoring sensors 11, 12 respectively provided in the screen 21, 22 together at the cable end CE (or by providing a respective pair of water sensing wires with respect to each screen) and providing the switching unit at the cable beginning CB, i.e. between the measuring circuit MC and the cable beginning CB. If the screens 21, 22 are connected to ground, the switches S31, S32 will connect the water sensing wires 11, 12 to ground. If the screens 21, 22 are connected to another potential or are an open-circuit, the switches S31, S32 will connect the wires 11, 12 to this screen potential. Alternatively, if the wires 21, 22 are respectively set to different potentials, the switches S31, S32 will respectively connect the wires 11, 12 to the respective potential of the respective screen 21, 22.

As may be taken from the description of the examples in FIG. 1, according to the invention a switching unit 3 having a first and second switching state is used for connecting a pair of wires, wherein at least one of them acts as a water sensing wire, to the screen potential or ground, whatever the screen potential may be. In order to allow the earth-free measurement, at least two different wires 11, 12 must be provided and the minimum requirement is to have, in a single-phase system, a single water sensing wire 12 and at least one return wire (which may also be a water sensing wire) or to have in a two-phase system, a respective water sensing wire 11, 12 in a respective screen. Alternatively, in the two phase system a pair of water sensing wires may be provided for each phase.

It may be noted that in the cases ⑤, ⑥ shown in FIG. 1d the screen 2 is only connected to ground at the cable beginning CB. However, it may be noted that the cases ⑤, ⑥ can be extended to respective cases ⑦, ⑧ (not shown in the drawings) where respectively the screen 2 would be connected directly to ground also at the cable end CE. Case ⑧ also has the afore-mentioned second primary advantage. Furthermore, it is possible to also connected the respective two pairs of water sensing wires at the cable end (here denoted as case (16)).

Hereinafter, further embodiments of the invention will be described with reference to three-phase systems.

Third Embodiment (Three-phase/Single Sensor)

Figure 2A:
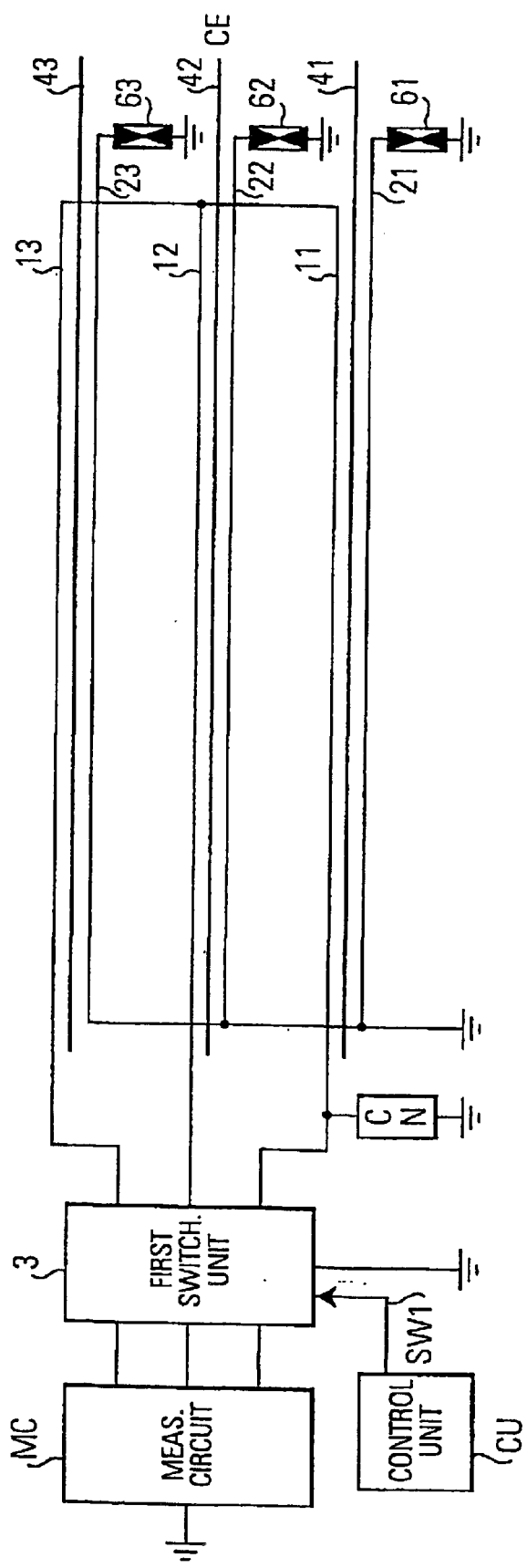
FIG. 2a shows a block diagram of a water monitoring system SYS in accordance with the invention applied to three-phase system.

FIG. 2a shows an embodiment of a water monitoring system SYS in accordance with one embodiment where the water monitoring system is applied to a power transmission system where a high voltage cable consists of three conductors 41, 42, 43 surrounded by respective screens 21, 22, 23.

A first water sensing wire 11 is provided in the screen 21 surrounding the first conductor 41. A second water sensing wire 12 is provided in the screen 22 surrounding the second conductor 42. A third water sensing wire 13 is provided in the screen 23 surrounding the third conductor 43. The first, second and third wires 11, 12, 13 are not connected at the cable end CE. At the cable end CE the water sensing wires 11, 12, 13 are connected together and the first water sensing wire 11 is connected to ground via the capacitive network CN at the cable beginning. The screens 21, 22, 23 are connected together at the cable beginning CB and are connected directly to ground. At the cable end CE the screens 21, 22, 23 are not connected to ground (are open) directly but via a respective high voltage protection circuit 61, 62, 63.

The first switching circuit 3 in FIG. 2a connects the three water sensing wires 11, 12, 13 in the first measurement phase to the screen potential=ground. Thus, in the first measuring phase the same voltages are induced in the sensors and the cable screens, independently as to whether the respective screens 21, 22, 23 are connected to ground or are open-circuited at the cable end CE. As was the case in FIG. 1, also in FIG. 2a, in the first measuring phase there are no voltage differences between the respective sensor 11; 12; 13 and the respective screen 21; 22; 23 which may lead to an electrical straining of the sensor insulation and to currents in possibly wet cable sections.

In the second switching state of the first switching unit 3 in FIG. 2a, the grounding or connection to the screen potential of the three water sensing wires 11, 12, 13 at the cable beginning CB is suspended and in this state the common insulation resistance of the water sensing wires can be measured and furthermore a locating of the water intrusion can be performed assuming that the insulation resistance is larger than the failure resistances. A measurement circuit MC as in principle described with reference to FIG. 5 can be used for carrying out the detection and locating of the water intrusion by performing voltage drop measurements at the respective water sensing wires 11, 12, 13.

As in the case of FIG. 1, the first measurement phase S1 may be 30 to 60 minutes and the second measuring phase may be 1 to 2 minutes, dependent on the possible water propagation characteristics and the time needed for a failure repair.

FIG. 2b shows an embodiment of the first switching unit 3 comprising three switches S31, S32, S33 controlled by the control signal SW1 output by the control unit CU. In the first switching state the switches are closed.

Figure 2C:
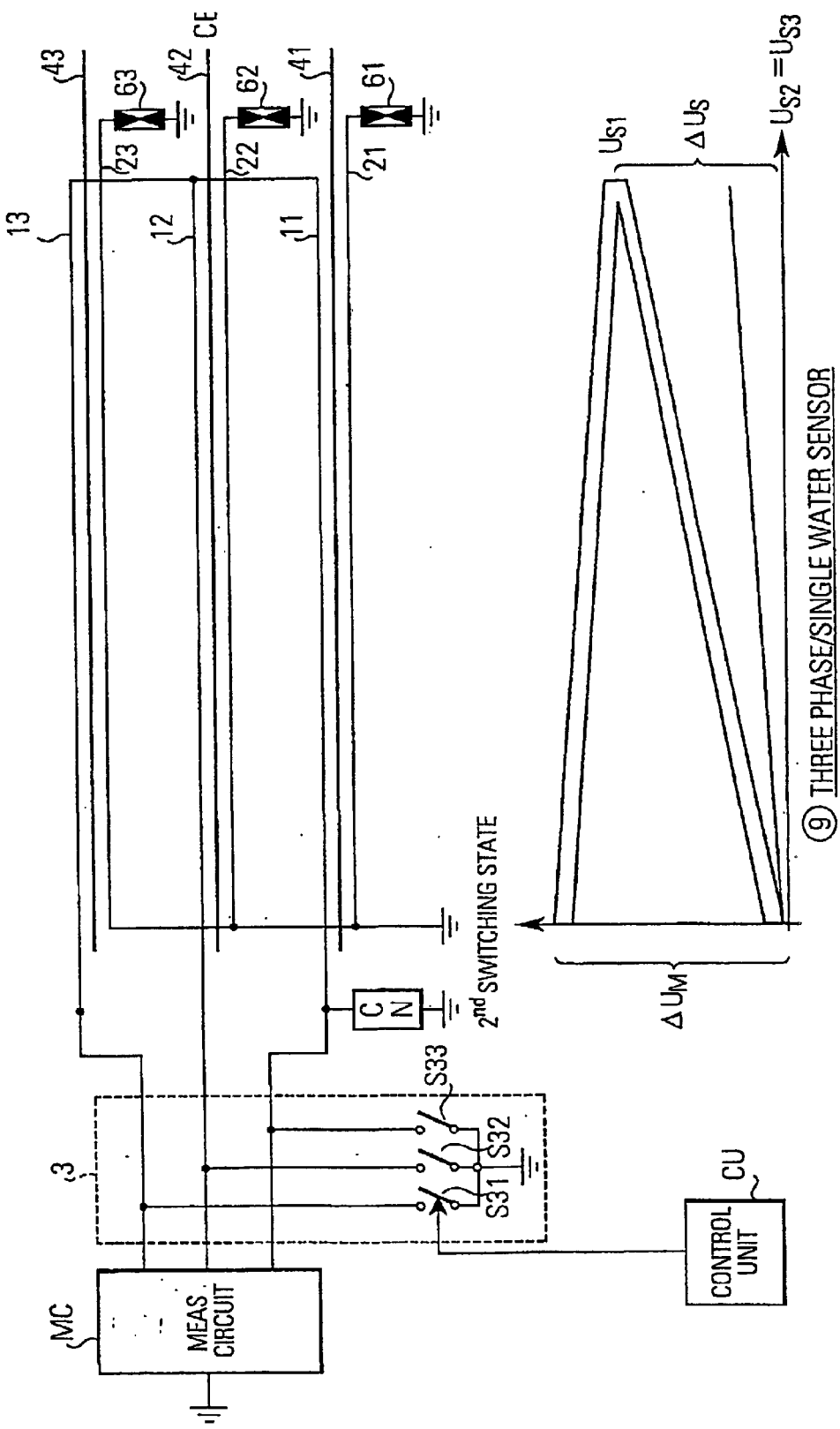
FIG. 2c shows the first switching unit 3 of the embodiment in FIG. 2b in the second switching state.

As shown in FIG. 2c, in the second switching state S2 the switches S31, S32, S33 are open. In FIG. 2a–c the screens 21, 22, 23 are connected to ground at the cable beginning CB and open at the cable end CE. The voltage characteristics for the wire arrangement in FIG. 2a for the measurement phase is also indicated in FIG. 2c (denoted as case ⑨).

Whilst in FIG. 2a–c the screens 11, 12, 13 are not connected to ground at the cable end CE, also a configuration can be provided (denoted here as case (11)) where the screens are connected to each other and to ground at the cable beginning CB and at the cable end CE. The voltage characteristics are similar as in case ⑨.

Fourth Embodiment (Three-phase/Double Sensor)

Figure 3A:
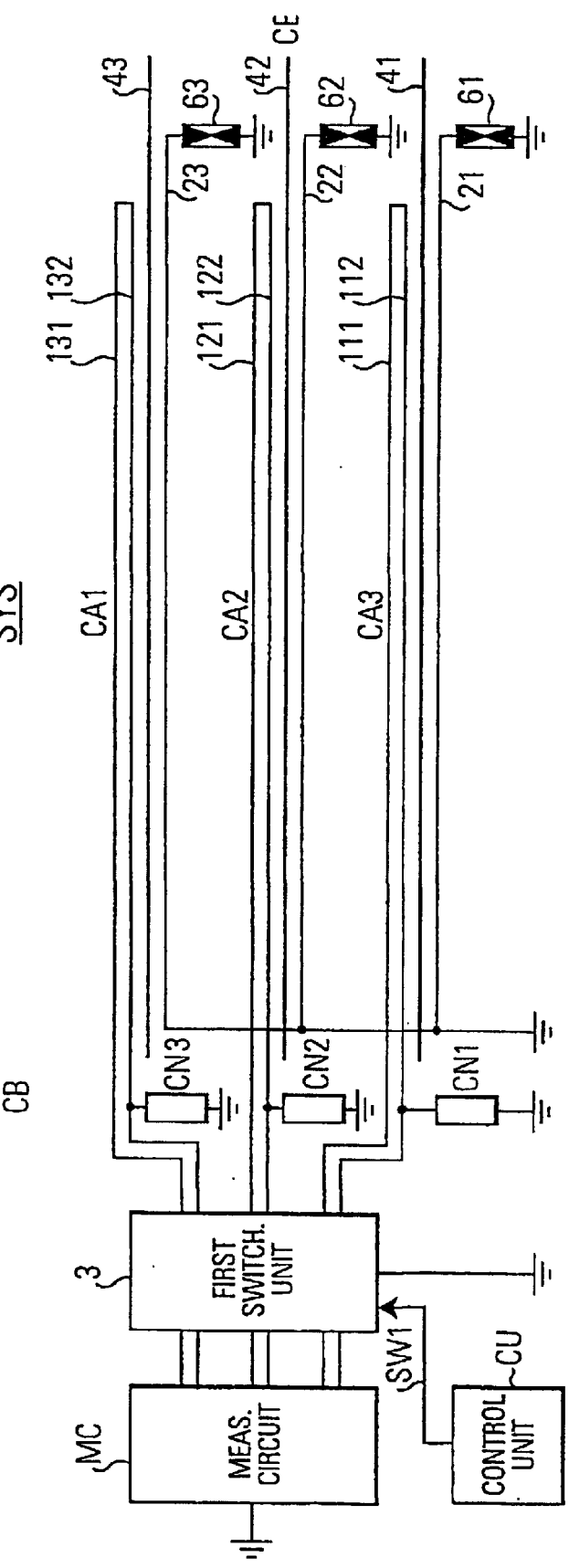
FIG. 3a shows an embodiment of the water monitoring system in accordance with the invention with the provision of two water sensing wires in each cable of a three-phase system.

FIG. 3a shows an embodiment of the inventive water monitoring system SYS when applied to a three-phase power transmission system wherein each cable CA1, CA2, CA3 is provided with two respective water sensors 111, 112; 121, 122; 131, 132. A first and-second water sensing wire 111, 112 is provided in the screen 21 surrounding a first conductor 41. A third and fourth water sensing wire 121, 122 are provided in the screen 22 surrounding the second conductor 42 and a fifth and sixth water sensing wire 131, 132 are provided in the screen 23 surrounding the third conductor 43. At the cable end CE the respective pairs of water sensing wires are connected to each other. By contrast to FIG. 2, the water sensing wires of the respective cables CA1, CA2, CA3 are not connected together. At the cable beginning CB a respective first water sensing wire 112, 122, 132 is connected to ground via a respective capacitive network CN1, CN2, CN3. At the cable beginning CB the screens are connected together and are connected to ground directly. At the cable end CE the screens 21, 22, 23 are open and optionally a high voltage protection 61, 62, 63 can be provided to ground.

A switching unit 3 for respectively connecting the pairs of water sensing wires to ground is shown in FIG. 3b. The first switching unit 3 comprises six switches S31–S36 which are respectively connecting the water sensing wires to ground or to the screen potential, depending on whether the screens 21, 22, 23 are connected to ground or are connected to a different screen potential.

FIG. 3b also shows the voltage characteristics for the measurement phase S2 (denoted as case ⑩). It may be seen from these characteristics that the wire arrangement of FIG. 3a, 3b has both the afore-mentioned first and second primary advantage. Whilst in FIG. 3a–b the screens 11, 12, 13 are not connected to ground at the cable end CE, also a configuration can be provided (denoted here as case (12)) where the screens are connected to each other and to ground at the cable beginning CB and at the cable end CE. The voltage characteristics are similar as in case (10) and possess at least the second primary advantage. Furthermore, it is possible to also connected the respective three pairs of water sensing wires at the cable end (here denoted as case (18)).

Figure 3C:
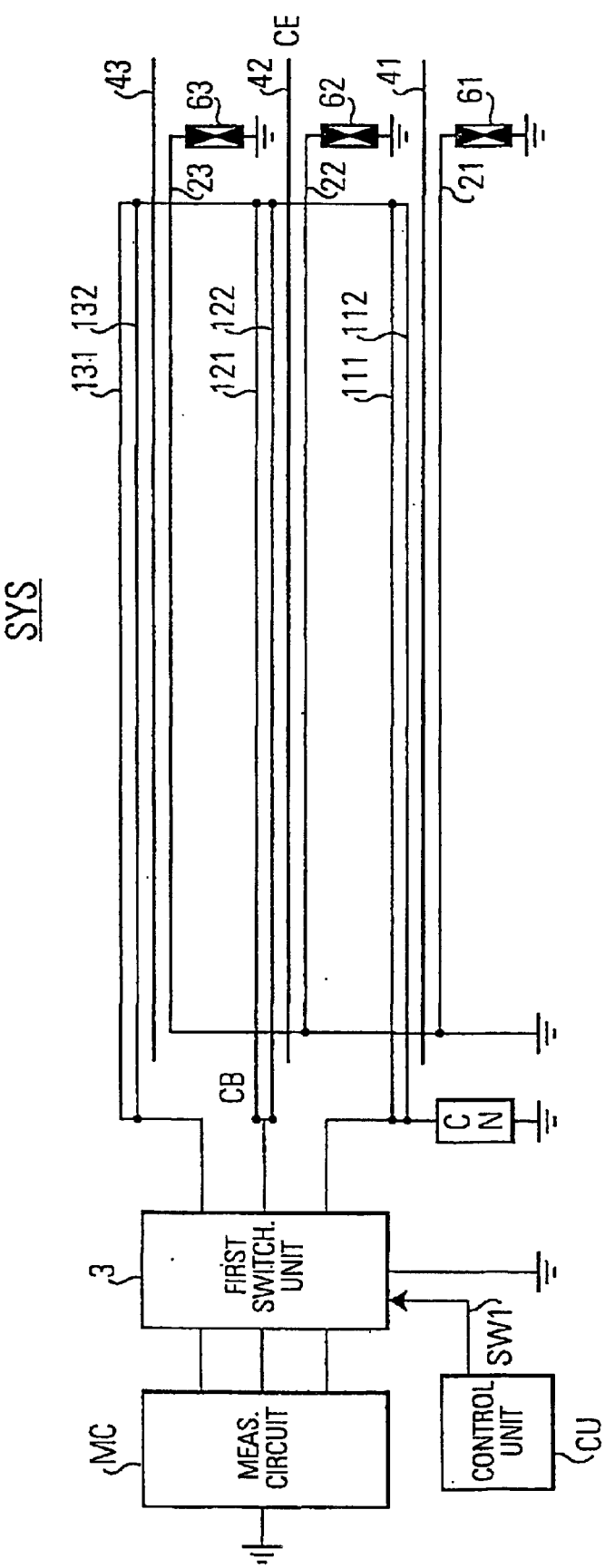
FIG. 3c shows another example of a water monitoring system SYS in accordance with the invention where respectively two water monitoring wires in each cable are connected at the cable beginning CB and the cable end CE.

FIG. 3c shows another embodiment of the monitoring system SYS in accordance with the invention (similar to FIG. 2a) when applied to a three-phase system. As in FIG. 3a, a pair of water sensing wires 111, 112; 121, 122; 131, 132 are provided in each screen 21, 22, 23 of each cable. Although FIG. 3c only shows two water sensing wires in each screen, there may be more than two water sensors in each screen. The two water sensing wires of each pair are connected to each other at the cable beginning CB and at the cable end CE and are preferably evenly distributed over the periphery of the cable. When a water intrusion occurs in this kind of cable, the distance over which the water has to migrate until it reaches one of the water sensing wires is reduced and thus the detection time for a water intrusion can be shortened.

As in FIG. 1–2 also the embodiment in FIG. 3c comprises a first switching unit 3 which connects to ground or to the screen potential the connected water sensing wires at the cable beginning CB. An embodiment of the first switching unit 3, as shown in FIG. 3d, again comprises three switches S31, S32, S33 for respectively connecting the water sensing wires to ground in response to the switching signal SW1.

Figure 3D:
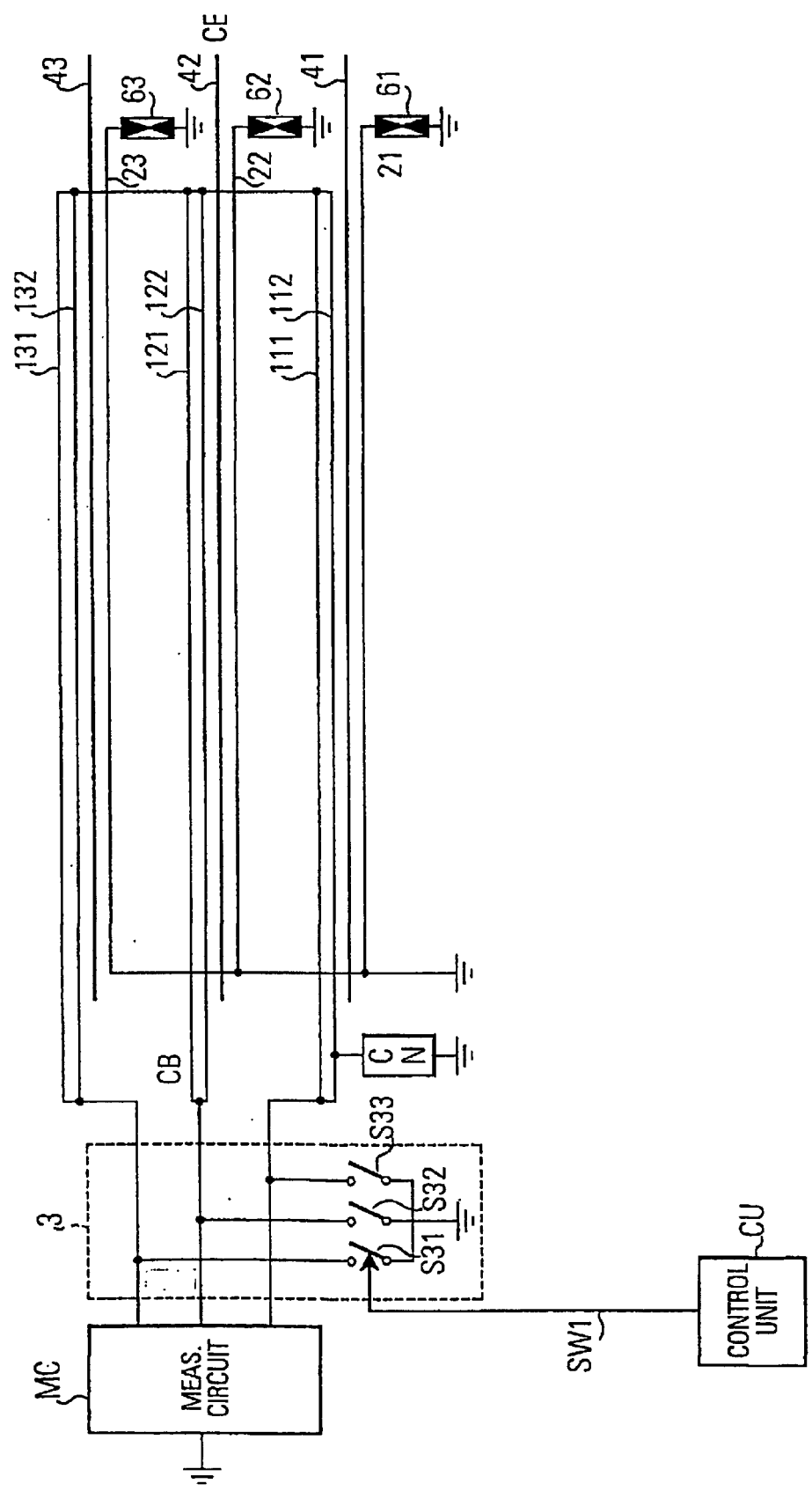
FIG. 3d shows an embodiment of the first switching unit 3 in case of FIG. 3c.

As can be seen from a comparison of FIG. 3a, 3b and FIG. 3c, 3d, in the embodiment in FIG. 3c, 3d the water sensing wires are connected at the cable beginning CB and at the cable end CE whilst in the embodiment in FIG. 3a, 3b the water sensing wires are only connected to each other per cable at the cable end CE.

Fifth Embodiment (Three-Phase/Double Sensor/Second Switch)

Figure 3E:
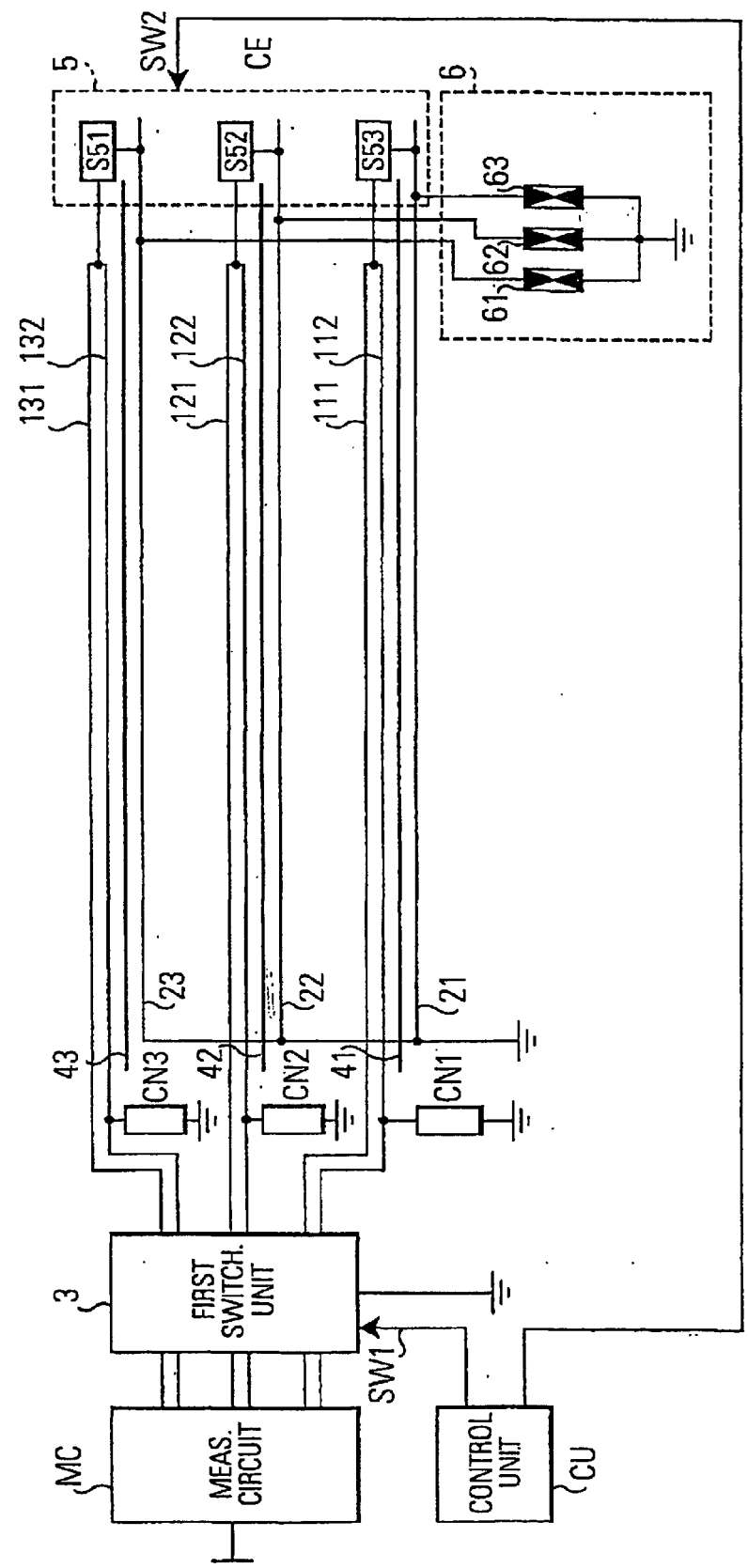
FIG. 3e shows another embodiment of the water monitoring system SYS in accordance with the invention, similar to FIG. 3a, however additionally comprising a second switching unit 5 and optionally an over-voltage protection switch unit 6.

FIG. 3e shows an embodiment of the inventive water monitoring system similar to FIG. 3a but comprising at the cable end CE a second switching unit 5 and the over-voltage protection unit 6 having the three over-voltage protection unit 61, 62, 63 as in FIG. 3a. It should however be noted that one of the units 5, 6 or both units 5, 6 may be provided. Similarly, as indicated with the dashed boxes in FIG. 1a, 1b, the unit 5 and/or unit 6 may also be used in the principle of the invention using only two wires in a single-phase transmission system or a double-phase transmission system. Furthermore, as explained above, the over-voltage protection unit 6 may be used in the embodiment in FIG. 2a, FIG. 3a and FIG. 3c.

As in the embodiment in FIG. 3c, also the embodiment in FIG. 3e is equipped with at least two water sensing wires for cables. A special feature of the embodiment in FIG. 3e is that the screens 21, 22, 23 are connected to ground at the cable beginning CB as in FIG. 3a and are an open-circuit at the cable end CE. The first switching unit 3 is again provided for connecting the respective water sensing wires 111, 112; 121, 122; 131, 132 to the screen potential, i.e. ground. This can be done by using a number of switches as shown with the switching unit 3 in the embodiment in FIG. 3b.

The grounding of the screens 21, 22, 23 at the cable beginning CB only is performed to avoid the induction losses in the screen and to increase the transmission power of the power transmission system. However, in the screens 21, 22, 23 voltages are induced which increase from the ground-connected cable beginning CB to the cable end CE continuously. For avoiding over-voltages between the screens 21, 22, 23 and the surrounding as a result of short circuit-currents or travelling waves, the open-circuited screens 21, 22, 23 are connected to ground via the over-voltage protection unit 6 at the cable end CE.

As shown in FIG. 3e, the over-voltage protection switch unit 6 comprises three over-voltage protection switches 61, 62, 63 for respectively connecting the first screen 21, the second screen 22 and the third screen 23 with ground.

Typically, the response voltage of the over-voltage protection switches 61, 62, 63 is about 1000 V. Thus, for any embodiment where the screens are not connected to ground at one end, i.e. the cable beginning CB or the cable end CE, an over-voltage protection switch unit 6 as shown in FIG. 3e may be provided at the very end where the screen is not connected to ground.

As already explained above, basically the same voltages are induced into the water sensors and in the screens because both of them in principle constitute a longitudinally extending conductor in the respective screen. When the screens are open-circuited at the end and the water sensing wires would be connected at the cable end CE, as shown in FIG. 3c, then this would result in large potential differences between the sensors and the screens resulting in a possible damage or destruction of the cables.

To avoid these large potential differences when the screens are open-circuited at the cable end CE, in FIG. 3e each cable has at least one pair of water sensing wires 111, 112; 121, 122; 131, 132 or respectively a plurality of pairs. The two wires of each pair are connected at the cable end CE as shown in FIG. 3e. Then, the isolation or resistance measurement by means of the voltage drop measurements is performed at each cable at the two sensors or sensor groups as was already explained in principle in 1a. As in the case of the embodiment in FIG. 1a and in the embodiment in FIG. 1b, also in FIG. 3e in the respective two water sensing wires the same voltages will be induced and these induced voltages add up, due to the series connection at the cable end CE, to zero. As in the other embodiments in FIG. 1–3, also the embodiment in FIG. 3e has a first measurement phase S1 where the pairs of water sensing wires are respectively connected to ground and the second measuring phase S2 where the water sensing wires are not connected to ground and where the measurement circuit MC carries out the water intrusion measurement by the voltage drop measurements as explained above. As in the other embodiments in FIG. 1–3, the first switching unit 3 in FIG. 3e can also comprise mechanical switches, galvanic switches or semiconductor switches.

Furthermore, as shown in FIG. 3e, at the cable end CE the second switch unit 5 is provided which for example includes three switches S51, S52, S53 for connecting the respective pair of water sensing wires 111, 112; 121, 122; 131, 132 to the respective screen 21; 22; 23. A first embodiment of these switches S51, S52, S53 is a simple over-voltage switch which sets the water sensing wires at the cable end CE to the respective screen potential in case of an over-voltage to avoid large potential differences between the sensor wires and the screens in a safe manner. Alternatively, as also shown in FIG. 3e, the switches S51, S52, S53 can be semiconductor switches or mechanical switches, which can be controlled with a second switching signal SW2 by a central control unit CU. For example, if the control unit CU detects that an over-voltage has occurred in the screens 21, 22, 23 resulting in a ground-connection via the over-voltage protection switches 61, 62, 63, then the control unit CU may decide that for safety reasons it is also necessary to actively connect the water sensing wires to the screens and thus with the ground because similar voltages will exist on the screens and on the water sensing wires both of which are open-circuited at the cable end CE.

In FIG. 1a it was already explained that in cases where a loop is being formed by two wires 11, 12, one of them, e.g. 11, may be a non-insulated water sensing wire whilst the other one, e.g. 12, may be a simple current return line or may even be an additional water sensing wire, as for example assumed in FIG. 3e. The difference between a normal water sensing wire and a simple return wire is that the water sensing wire must have a water-permeable insulation to allow the water intrusion detection whilst a simple return wire may have a full insulation not allowing any water intrusion. As explained above, the main task of the return wire is the voltage addition and the current feedback. Therefore, also in the embodiment in FIG. 3e, one wire of the respective wire pairs may be a water sensing wire whilst the other wire of the respective wire pair can be a full insulation for merely serving as a current feedback line.

Sixth Embodiment (FIG. 3c+FIG. 3e)

Another embodiment of the invention comprises some aspects of the embodiment in FIG. 3c and some aspects of the embodiment in FIG. 3e. This further embodiment is characterized by the fact that all water sensing wires in the embodiment in FIG. 3e are connected also at the cable end CE. That is, in each cable the water sensing wire pairs are not connected at the cable beginning CB (to allow a measurement) and the screens are not connected together at the cable end CE whilst additionally the over-voltage protection unit 6 is provided for a possible ground connection. The main advantage of such an embodiment is that at the cable beginning CB the resistance or isolation measurements (voltage drop measurements) can be carried out between the sensors of each cable with the particular advantage that no alternating voltages are present on the measurement terminals and that in case of a water intrusion the water intrusion location can be detected in an easy manner and with high accuracy because due to the water sensing wire connection at the cable end CE the common insulation resistance with respect to the respective screen is carried out. This increases the detection accuracy.

Seventh Embodiment (Third Switching Unit)

As explained above, according to the invention a first switching unit can be provided for all kinds of single, double and three phase wire arrangements together with various combinations of grounding the water sensing wires capacitively to ground and connecting the screens together and/or the ground at the cable beginning and/or the cable end. From the voltage characteristics it can be derived that case ②, ⑥ and ⑩ provide by far the best configurations because also in the measurement phase these wire arrangements show both the first and second primary advantage of low electrical straining of the sensor isolation and a small influence on the electrical measurements.

Figure 3F:
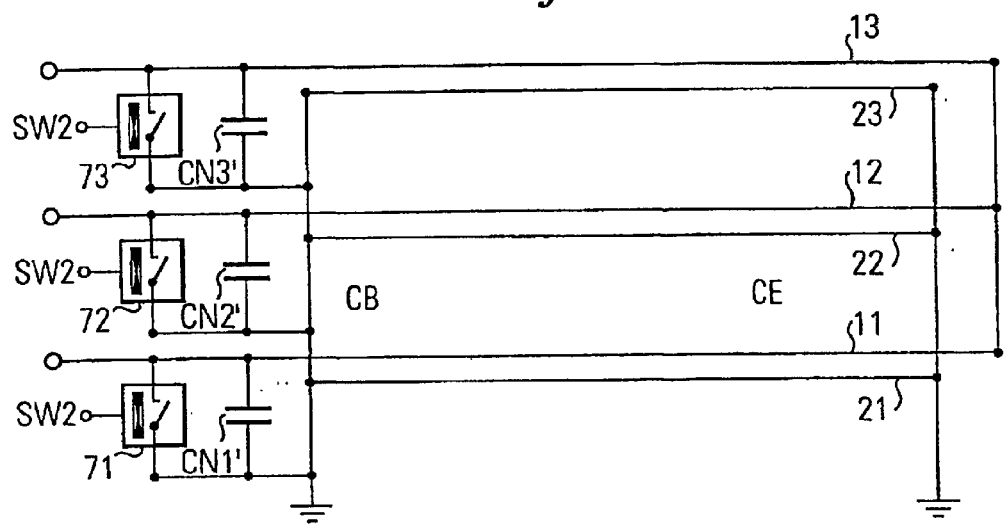
FIG. 3f shows another embodiment of the water monitoring system SYS applied to a three-phase system, where an additional third switching unit is provided between each water sensing wire and the respective screen, showing the third switching unit in a switching state, where the screen and the water sensing wire are disconnected.
Figure 3G:
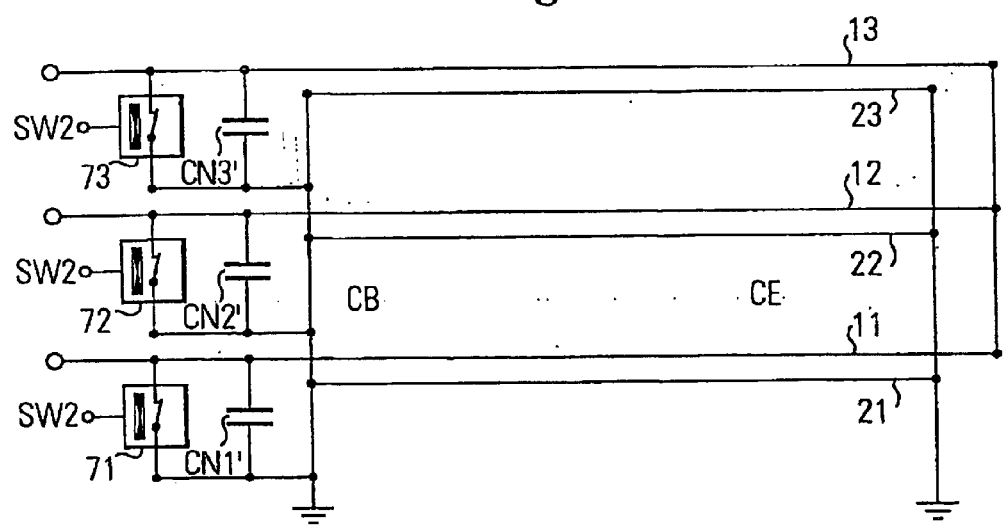
FIG. 3g shows the same configuration as in FIG. 3f with the third switching unit in the connected state, where the screen and the water sensing wire are respectively connected per phase.

In all these embodiments it can be further advantageous to provide a further third switching unit at the cable beginning. As shown in FIG. 3f, FIG. 3g (for the example of a three phase system), this third switching unit 71, 72, 73 can be provided between each screen 21, 22, 23 and ground (or the screen potential) at the cable beginning CB. In the simplest case it can be an over-voltage protection switch which automatically connects to ground the respective screen 21, 22, 23, when an over-voltage occurs. The third switching unit 71, 72, 73 can be adapted to be controlled by a further switching signal SW2 from the control unit CU. Thus, the grounding of the screens 21, 22, 23 at the cable beginning CB together with the grounding of the water sensing wires at the cable beginning can be controlled in order to avoid difference voltage problems, as will be explained below with details.

In FIG. 3f, 3g the three-phase cable arrangement for transmission of the three-phase current is illustrated for the two different switching states of the third switching unit 71, 72, 73. In FIG. 3f, 3g the screens 21, 22, 23 of the individual cables as well as the water sensors 11, 12, 13 are shown. The screens 21, 22, 23 of the cables are connected to ground at the cable beginning CB as well as on the cable end CE. Thus, this arrangement corresponds to the arrangement in FIG. 2a with additionally grounding the screens 21, 22, 23 at the cable end CE. The conductor currents in the cables (the conductors are not shown in FIG. 3f, 3g) induce voltages in the screens, which cause a current flow in the screens. The ohmic voltage drop caused by the current compensates the induced voltage, whereby the potential of the screen is equal to the ground potential at any location. Ideally, no current flows via the ground connection.

The water sensors 11, 12, 13 are let out at the cable end CE and are connected to each other. However, the water sensing wires are not connected to a ground at the cable end CE.

As was the case in FIG. 4 for a first switching unit, also in FIG. 3f, 3g two switching states can be distinguished, namely a measurement phase, which is a short period and a protection phase, which is a long period of time. Independent of the switching state the water sensors are connected at the cable beginning CB to ground via a capacitive network CN 1', CN2', CN3', for example via a capacitor. This measure allows in the switching state S2 "measurement" (FIG. 3f) that due to the induced voltage in the water sensor also an alternating current can flow, which is so small that it does not cause any significant ohmic voltage drop and thus does not reduce the difference voltage between the cable screen and the water sensor. Due to the ratio of the capacitances of the water sensors to the cable screens to the external capacitors CN1', CN2', CN3' the effect of voltage division occurs, which causes a stable potential-wise coupling of the water sensor to the cable screen.

The external capacitor CN1', CN2', CN3' should have a capacitance, which is preferably equal or larger than that of the water sensor to the cable screen. If capacitive contributions of the water sensor are assumed to be C'=0.1 $\mu$F/km to 2.5 $\mu$F/km (dependent on the construction) and if cable length between 0.5 km and 5 km is assumed, the values of the resulting external capacitance is between 0.05 $\mu$F and 12.05 $\mu$F.

The external capacitance does not obstruct the measurement of the resistance of the sensor by using direct current if capacitors having a high Q are used.

Each sensor is provided with a switch as is schematically indicated in FIG. 3f, 3g and this switch switches the sensor to the screen potential (e.g. ground) when a defined over-voltage of the sensor with respect to the screen occurs during the measurement phase S2. In this case there is an automatic triggering of the switch connecting the sensor to the screen potential, i.e. ground.

However, the third switching unit 71, 72, 73 can also be actively controlled with a switching signal SW2 output from the control unit CU. The outputting of the external switching command SW2 of causing the third switching unit 71, 72, 73 to close, results in a protection phase. In the protection phase each sensor is connected to the screen with a low impedance. The induced voltage cause a current flow and the compensation of the induced voltage in the same manner as in the cable screen. Thus, in all operation conditions of the cable voltage differences between the water sensor and the cable screen are avoided.

The equal potential is also required to avoid electrochemical and thermal reactions between the water sensor and the cable screen if water has intruded through a coating damage and said damage has not been repaired.

As was already described above (see FIG. 3e) for a further improvement also an automatic or externally switchable over voltage-switch S51, S52, S53 can be provided at the end of the cable arrangement between the water sensor and the screen. These three switches S51, S52, S53 are part of the second switching unit, which is controlled also via the second switching signal SW2 output by the control unit CU. There are various possibilities to transfer the switching signal SW2 from the cable beginning CB (where the control unit CU is normally provided) to the cable end CE, for example through a radio link or even through a separately drawn wire.

Whilst FIG. 3f, 3g only shows the provision of the third switching unit 71, 72, 73 at the cable beginning CB for the case of a three-phase arrangement, of course it may be noted that likewise such a third switching unit can be provided for the single-phase and double-phase arrangement.

Eighth Embodiment (First Switching Unit at Cable End)

In the above-described embodiments it has been assumed that a first switching unit having two different states is provided at the cable beginning CB for each of the examples of a single-phase, double-phase or a three-phase cable arrangement. Furthermore, it has been described that for each of such cable arrangements at the cable end CE and/or at the cable beginning CB a second switching unit and/or a third switching unit can be provided, which, respectively, connect the water sensing wire to the screen.

However, it may be noted that the first switching unit, which respectively connects the water sensing wires to the screen potential (e.g. to ground) can also be provided additionally or separately at the cable end CE. It can then also be controlled by a switching signal SW1 let through a wire to the cable end location or let to the cable end location via radio or optical fibre. At the cable end this switching unit is called second switching unit.

It may be noted that in FIG. 3f, 3g the third switching unit 71, 72, 73 connects the respective water sensing wire to the screen potential whilst the capacitors network CN1', CN2', CN3' is provided. However, on the left-hand side in FIG. 3f, 3g it is of course assumed that additionally the first switching unit 3 is present for the three-phases. Thus, on the cable beginning CB there may be a first and third switching unit 3, 7, which, however, do not entirely perform the same function. In particular, the first switching unit and the third switching unit may be independently controlled via two independent switching signals SW1, SW2. However, as will be understood below, the switching signal SW2 can also be constituted by the first switching signal SW1.

The first switching unit switches the water sensor wires to ground (or to the screen potential) in a protection state, i.e. in the first switching state S1 as shown in FIG. 4. In the measurement phase S2 the first switching unit switches the water sensor wires to the measurement circuit. By contrast the third switching unit provided at the cable beginning switches the water sensor wires to ground automatically when a defined over-voltage occurs between water sensor and ground (or the screen potential). Furthermore, it is possible that the third switching unit is actively operated by the switching signal SW2 output by the control unit.

Whilst the first and third switching unit essentially carry out the similar function, in practice, i.e. in a real cable installation they are arranged in some distance, i.e. the first switching unit is arranged at the location of the measurement circuit MC (or is even integrated in the measurement circuit) and the third switching unit is arranged at the cable beginning (or the cable end, as explained above) and the distance between the first switching unit/measurement circuit and the third switching unit is bridged by a measurement cable (e.g. in the range of some 100 m). Thus, preferably, the first switching unit is arranged close to the measurement system and the third switching unit is arranged close to the end of the cable. Thus, it will be possible to protect from over-voltages with high reliability both the measurement system (with the first switching unit) and the cable (with the third switching unit). However, with respect to electrical circuits and the likelihood of over-voltages it may suffice to only arrange one of the first and third switching units.

It may also be noted that in addition to the second switching unit at the cable end (corresponding to the third switching unit at the cable beginning) a further fourth switching unit may be arranged at a distance from the cable end, to correspond to the first switching unit. Also this fourth switching unit will automatically or in response to the first and/or second switching signal or in fact by a further switching signal connect the water sensor at the cable end to the screen or ground potential. That is, the following relationship can be established:

|  | Cable beginning CB | | Cable end CE |
|---|---|---|---|
|  | directly at the measurement circuit MC | directly at the cable |  |
| only external control | first switching unit | ⟹ | second switching unit |
| external and self-control (automatic) | ⟸ | third switching unit | fourth switching unit |

INDUSTRIAL APPLICABILITY

The above-described water monitoring system is particularly used for high power transmissions using high voltage transmission cables. The invention is characterized by having a first and second measuring phase such that independently of the connection of the water sensing wires and the screens at the cable beginning CB and at the cable end CE it is avoided that a difference of potentials on the water sensing wires and the screens lead to a damage of the cable. This is possible because in the first measuring phase the water sensing wires at the cable beginning are connected to the screen potential and only in a shorter second measuring phase the measurement is carried out by performing voltage drop measurements (a resistance or isolation of measurements) on the water sensing wires with respect to ground.

It may be noted that the concept of using two different measuring phases with respect to the water sensing wires may advantageously also be used in other transmission systems where a water intrusion is to be detected. For example, this measurement technique may also be used in telecommunication cables.

Furthermore, it should be noted that the invention is not restricted to the above description of the best mode of the invention as presently conceived by the inventors. That is, various variations and modifications of the invention may be carried out on the basis of the above teachings. In particular, the invention may comprise embodiments, which result from the combination of features which have been individually and separately described and claimed in the description, the figures and the claims.

Reference numerals in the claims only serve clarification purposes and do not limit the scope of these claims.

What is claimed is:

1. A water monitoring system for a high voltage cable including at least one conductor and a screen surrounding said conductor, comprising:
   a1) a first water sensing wire extending in the screen between the cable beginning and the cable end;
   a2) at least a second wire connected to the first water sensing wire at the cable end for forming a loop and extending from the cable end to the cable beginning;
   b) a measuring circuit provided at the cable beginning and adapted to determine at least the occurrence of a water intrusion into the cable on the basis of voltage drop measurements at the first water sensing wire or the second wire;
   c) a first switching unit between the cable beginning and the measurement circuit, said first switching unit being adapted to assume, in response to a first switching signal,
   a first switching state in which said first water sensing wire and said second wire are connected to a screen potential when the first switching signal has a first state; and
   a second switching state in which said first water sensing wire and said second wire are disconnected from the screen potential when the first switching signal has a second state; and
   d) a control unit adapted to output the first switching signal in the first state over a first predetermined time interval and thereafter to switch the first switching signal into the second state over a second predetermined time interval; wherein
   e) said measurement circuit is adapted to perform said water intrusion measurement in said second predetermined time interval.

2. The water monitoring system according to claim 1, wherein in said first switching state said measurement circuit is disconnected from the wires and in said second switching state said measurement circuit is connected to the wires.

3. The water monitoring system according to claim 1, for a high voltage cable consisting of one conductor surrounded by a screen, wherein said first and second wires are provided in the screen surrounding the conductor.

4. The water monitoring system according to claim 1, for a high voltage cable consisting of at least two conductors surrounded by a respective screen wherein said first water sensing wire is provided in the screen surrounding the first conductor; and said second wire is a second water sensing wire and is provided in the screen surrounding the second conductor.

5. The water monitoring system according to claim 1, for a high voltage cable consisting of three conductors surrounded by a respective screen, further comprising:
   a third wire connected at the cable end to the connected first and second wires and also extending from the cable end to the cable beginning; wherein
   said first water sensing wire is provided in the screen surrounding the first conductor;
   said second wire as a second water sensing wire is provided in the screen surrounding the second conductor; and
   said third wire as a third water sensing wire is provided in the screen surrounding the third conductor.

6. The water monitoring system according to claim 1, or claim 5, wherein said at least one screen is connected to ground at the cable beginning or the cable end or at the cable beginning and the cable end.

7. The water monitoring system according to claim 1, for a high voltage cable consisting of three conductors surrounded by a respective screen, wherein said first and second wires are provided in the screen surrounding the first conductor and are connected at the cable end;
   third and fourth water sensing wires are provided in the screen surrounding the second conductor and are connected at the cable end; and
   fifth and sixth water sensing wires are provided in the screen surrounding the third conductor and are connected at the cable end.

8. The water monitoring system according to claim 7, wherein said first and second water sensing wires are connected at the cable beginning, said second and third water sensing wires are connected at the cable beginning, said fifth and sixth water sensing wires are connected at the cable beginning and that said first and sixth water sensing wires are connected at the cable end.

9. The water monitoring system according to claim 1, wherein said first switching unit comprises two switches for respectively connecting the first and second water sensing wires with ground.

10. The water monitoring system according to claim 5, or claim 7, wherein said first switching unit comprises three switches for respectively connecting the first, second and third water sensing wires with ground.

11. The water monitoring system according to claim 7, wherein said first switching unit comprises six switches for respectively connecting the first to sixth water sensing wires with ground.

12. The water monitoring system according to claim 1, wherein a second switching unit is provided at the cable end for connecting the water sensing wire to the screen.

13. The water monitoring system according to claim 7, wherein said second switch unit comprises three switches for respectively connecting the connected first and second wires, said connected third and fourth water sensing wires and said fifth and sixth water sensing wires to the first screen, said second screen and said third screen, respectively.

14. The water monitoring system according to claim 1 or claim 12 or claim 13, further comprising:
   an over-voltage protection unit between the screen and ground.

15. The water monitoring system according to claim 14, wherein said over-voltage protection unit comprises three over-voltage protection switches for respectively connecting the first screen, said second screen and said third screen, respectively, with ground.

16. The water monitoring system according to claim 1, wherein said first predetermined time interval is longer than said second predetermined time interval.

17. A water monitoring method for a cable including at least one conductor and a screen surrounding said conductor, the method comprising a1) outputting, from a control unit over a first predetermined time interval, a first switching signal with a first state to a first switching unit in order that first and second sensing wires are connected to a screen potential, the first water sensing wire extending in the screen between the cable beginning and the cable end and the second wire connected to the first water sensing wire at the cable end for forming a loop and extending from the cable end to the cable beginning; and thereafter a2) outputting from said control unit over a second predetermined time interval said first switching signal with a second state to said first switching unit in order that said first and second wires are disconnected from said screen potential; and b) performing water intrusion measurements by a measurement circuit in said second predetermined time interval.

18. The water monitoring method according to claim 17, wherein said steps a1) and a2) are cyclically repeated.

19. The water monitoring method according to claim 17, further comprising disconnecting in said first switching state said measurement circuit from the wires and connecting in said second switching state said measurement circuit to the wires.

20. The water monitoring method according to claim 17, wherein said first predetermined time interval is longer than said second predetermined time interval.

* * * * *